United States Patent
Aurangzeb et al.

(10) Patent No.: US 11,074,667 B1
(45) Date of Patent: Jul. 27, 2021

(54) FAST PARTIAL SCALARIZATION

(71) Applicant: QUALCOMM Incorporated, San Diego, CA (US)

(72) Inventors: Aurangzeb, San Diego, CA (US); Litong Song, San Diego, CA (US); Ruihao Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/821,827

(22) Filed: Mar. 17, 2020

(51) Int. Cl.
| | |
|---|---|
| G06F 15/80 | (2006.01) |
| G06F 9/30 | (2018.01) |
| G06T 1/20 | (2006.01) |
| G06F 8/41 | (2018.01) |
| G06T 15/00 | (2011.01) |
| G06T 15/80 | (2011.01) |

(52) U.S. Cl.
CPC .......... *G06T 1/20* (2013.01); *G06F 8/443* (2013.01); *G06F 9/30036* (2013.01); *G06F 15/8053* (2013.01); *G06T 15/005* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 8,010,944 B1* | 8/2011 | Kilgard | G06F 8/315 717/116 |
| 10,908,900 B1* | 2/2021 | Ross | G06F 9/30029 |
| 2008/0275908 A1* | 11/2008 | Indyk | G06F 16/2474 |
| 2009/0089763 A1* | 4/2009 | Chen | G06T 15/50 717/140 |
| 2013/0212353 A1* | 8/2013 | Mimar | G06F 9/345 712/4 |
| 2015/0039851 A1* | 2/2015 | Uliel | G06F 9/30036 712/4 |
| 2015/0193234 A1* | 7/2015 | Udayakumaran | G06F 8/441 712/3 |
| 2017/0083323 A1* | 3/2017 | Howes | G06F 15/8053 |

* cited by examiner

*Primary Examiner* — Joni Hsu
(74) *Attorney, Agent, or Firm* — Campbell C. Chiang; Holland & Hart LLP

(57) ABSTRACT

Methods, systems, and devices for fast partial scalarization are described. A device may generate a representation of a set of vectors and a set of vector instructions associated with the set of vectors. The device may determine information associated with a vector in the set of vectors based on the representation, the information including an indication of splitting the vector and splitting one or more vector instructions associated with the vector. In some aspects, the device may associate the vector to one or more other vectors in the set of vectors based on one or more vector instructions related to the set of vectors. The device may update the information based on the associating and generate partially scalarized instructions based on the updating. The device may generate the partially scalarized instructions by excluding a subset of vector instructions and generating additional subsets of vector instructions and scalar instructions.

20 Claims, 14 Drawing Sheets

| X | Y | Z | W | Split |
|---|---|---|---|---|
| 01 | 11 | 11 | 10 | v4 |
| 01 | 11 | 10 | 00 | v3, v1 |
| 00 | 01 | 11 | 10 | v1, v3 |
| 01 | 10 | 01 | 10 | v2, v2 |
| 01 | 10 | 00 | 00 | v2, v1, v1 |
| 00 | 01 | 10 | 00 | v1, v2, v1 |
| 00 | 00 | 01 | 10 | v1, v1, v2 |
| 00 | 00 | 00 | 00 | v1, v1, v1, v1 |

FIG. 4A — 400

| X | Y | Z | Split |
|---|---|---|---|
| 01 | 11 | 10 | v3 |
| 01 | 10 | 00 | v2, v1 |
| 00 | 01 | 10 | v1, v2 |
| 00 | 00 | 00 | v1, v1, v1 |

FIG. 4B — 401

| X | Y | Split |
|---|---|---|
| 01 | 10 | v2 |
| 00 | 00 | v1, v1 |

FIG. 4C — 402

| X | Y | Z | W | Split |
|---|---|---|---|---|
| 01 | 10 | 01 | 10 | v2, v2 |
| 01 | 11 | 10 | 00 | v3, v1 |
| 01 | 10 | 00 | 00 | v2, v1, v1 |

| X | Y | Z | W | Split |
|---|---|---|---|---|
| 01 | 11 | 11 | 10 | v4 |
| 00 | 01 | 10 | 00 | v1, v2, v1 |
| 00 | 01 | 10 | 00 | v1, v2, v1 |

| X | Y | Z | Split |
|---|---|---|---|
| 01 | 10 | 00 | v2, v1 |
| 00 | 01 | 10 | v1, v2 |
| 00 | 00 | 00 | v1, v1, v1 |

```
%35 = OpConstantComposite %v4float %float_0 %float_0 %float_0 %float_0
%temp_op = OpConstantComposite %v4float %float_0 %float_0 %float_0 %float_0
%22 = OpImageSampleImplicitLod %v4float %17 %21
%26 = OpVectorShuffle %v2float %22 %22 0 1
%32 = OpCompositeConstruct %v4float %float_1 %float_1 %float_1 %float_1
%39 = OpCompositeExtract %float %22 %uint_2
%42 = OpFMul %float %39 %float_255
%44 = OpCompositeExtract %float %22 %uint_3
%46 = OpFAdd %float %42 %44
%51 = OpCompositeConstruct %v2float %float_1 %float_1
%52 = OpFDiv %v2float %26 %51
%54 = OpVectorShuffle %v4float %temp_op %52 4 5 2 3
%56 = OpVectorShuffle %v2float %22 %22 2 3
%58 = OpVectorTimesScalar %v2float %56 %46
%60 = OpVectorShuffle %v4float %54 %58 0 1 4 5
%62 = OpCompositeExtract %float %60 %uint_2
%64 = OpCompositeExtract %float %32 %uint_3
%66 = OpFAdd %float %62 %64
%67 = OpCompositeInsert %v4float %66 %60 %uint_2
%70 = OpFAdd %v4float %32 %35
%73 = OpFAdd %v4float %67 %70
       OpStore %frag_color %73
```

| Relationship for Updating Split Info | Encoding | Split Information |
|---|---|---|
| %26.xy ⇔ %22.xy | %35: 1 3 3 2 | %35 (v4) : v4 |
| %52.xy ⇔ %26.xy ⇔ %51.xy | %tmp: 1 2 1 2 | %temp_op (v4) -> v2, v2 |
| %54.xy ⇔ %temp_op.zw | %22: 1 2 0 0 | %22 (v4) -> v2, v1, v1 |
| %54.zw ⇔ %52.xy | %26 (v2): 1 2 | %26 (v2) : v2 |
| %56.xy ⇔ %22.zw | %32: 1 3 2 0 | %32 (v4) -> v3, v1 |
| %58.xy ⇔ %56.xy | %51 (v2): 1 2 | %51 (v2) : v2 |
| %60.xy ⇔ %54.xy | %52 (v2): 1 2 | %52 (v2) : v2 |
| %60.zw ⇔ %58.xy | %54: 1 2 1 2 | %54 (v4) -> v2, v2 |
| %67 ⇔ %60 (v4) | %56 (v2): 1 2 | %56 (v2) : v2 |
| %70 ⇔ %32 ⇔ %35 (v4) | %58 (v2): 1 2 | %58 (v2) : v2 |
| %73 ⇔ %67 ⇔ %70 (v4) | %60: 1 2 0 0 | %60 (v4) -> v2, v1, v1 |
| | %67: 1 3 3 2 | %67 (v4) : v4 |
| | %70: 1 3 3 2 | %70 (v4) : v4 |
| | %73: 1 3 3 2 | %73 (v4) : v4 |

| Relationship for Updating Split Info | Encoding | Split Information |
|---|---|---|
| %26.xy ⇔ %22.xy<br>%26.xy ⇔ %51.xy<br>%52.xy ⇔ %26.xy<br>%52.xy ⇔ %51.xy<br>%54.xy ⇔ %temp_op.zw<br>%54.zw ⇔ %52.xy<br>%56.xy ⇔ %22.zw<br>%58.xy ⇔ %56.xy<br>%60.xy ⇔ %54.xy<br>%60.zw ⇔ %58.xy<br>%67 ⇔ %60 (v4)<br>%70 ⇔ %32 (v4)<br>%70 ⇔ %35 (v4)<br>%32 ⇔ %35 (v4)<br>%73 ⇔ %67 (v4)<br>%73 ⇔ %70 (v4)<br>%67 ⇔ %70 (v4) | %35: 1 3 2 0<br>%tmp: 1 2 1 2<br>%22: 1 2 0 0<br>%26 (v2): 1 2<br>%32: 1 3 2 0<br>%51 (v2): 1 2<br>%52 (v2): 1 2<br>%54: 1 2 1 2<br>%56 (v2): 0 0<br>%58 (v2): 0 0<br>%60: 1 2 0 0<br>%67: 1 2 0 0<br>%70: 1 2 0 0<br>%73: 1 2 0 0 | %35 (v4) -> v3, v1<br>%temp_op (v4) -> v2, v2<br>%22 (v4) -> v2, v1, v1<br>%26 (v2) : v2<br>%32 (v4) -> v3, v1<br>%51 (v2) : v2<br>%52 (v2) : v2<br>%54 (v4) -> v2, v2<br>%56 (v2) -> v1, v1<br>%58 (v2) -> v1, v1<br>%60 (v4) -> v2, v1, v1<br>%67 (v4) -> v2, v1, v1<br>%70 (v4) -> v2, v1, v1<br>%73 (v4) -> v2, v1, v1 |

FIG. 6C 601-c / 602-c / 603-c

| Relationship for Updating Split Info | Encoding | Split Information |
|---|---|---|
| %26.xy ⇔ %22.xy<br>%26.xy ⇔ %51.xy<br>%52.xy ⇔ %26.xy<br>%52.xy ⇔ %51.xy<br>%54.xy ⇔ %temp_op.zw<br>%54.zw ⇔ %52.xy<br>%56.xy ⇔ %22.zw<br>%58.xy ⇔ %56.xy<br>%60.xy ⇔ %54.xy<br>%60.zw ⇔ %58.xy<br>%67 ⇔ %60 (v4)<br>%70 ⇔ %32 (v4)<br>%70 ⇔ %35 (v4)<br>%32 ⇔ %35 (v4)<br>%73 ⇔ %67 (v4)<br>%73 ⇔ %70 (v4)<br>%67 ⇔ %70 (v4) | %35: 1 2 0 0<br>%tmp: 1 2 1 2<br>%22: 1 2 0 0<br>%26 (v2): 1 2<br>%32: 1 2 0 0<br>%51 (v2): 1 2<br>%52 (v2): 1 2<br>%54: 1 2 1 2<br>%56 (v2): 0 0<br>%58 (v2): 0 0<br>%60: 1 2 0 0<br>%67: 1 2 0 0<br>%70: 1 2 0 0<br>%73: 1 2 0 0 | %35 (v4) -> v2, v1, v1<br>%temp_op (v4) -> v2, v2<br>%22 (v4) -> v2, v1, v1<br>%26 (v2) : v2<br>%32 (v4) -> v2, v1, v1<br>%51 (v2) : v2<br>%52 (v2) : v2<br>%54 (v4) -> v2, v2<br>%56 (v2) -> v1, v1<br>%58 (v2) -> v1, v1<br>%60 (v4) -> v2, v1, v1<br>%67 (v4) -> v2, v1, v1<br>%70 (v4) -> v2, v1, v1<br>%73 (v4) -> v2, v1, v1 |

FIG. 6D 603-d

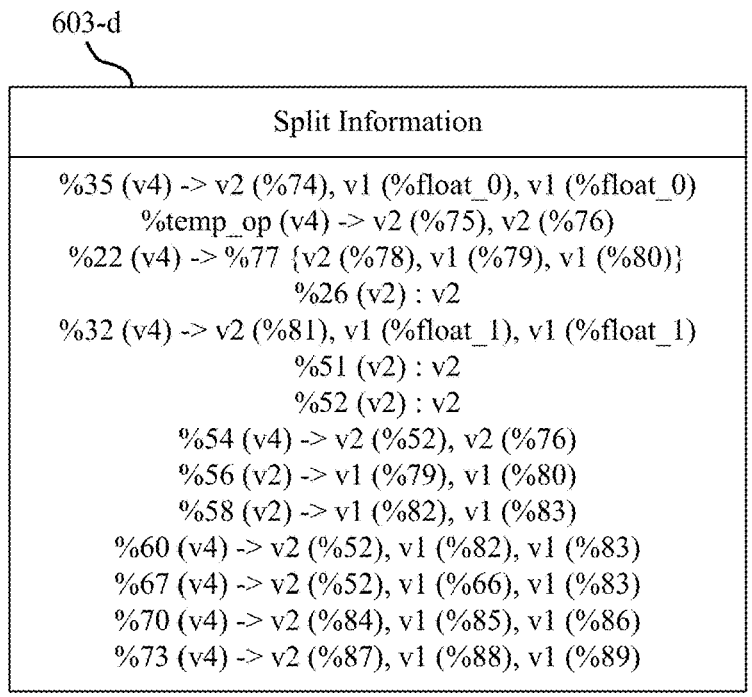

| Split Information |
|---|
| %35 (v4) -> v2 (%74), v1 (%float_0), v1 (%float_0) |
| %temp_op (v4) -> v2 (%75), v2 (%76) |
| %22 (v4) -> %77 {v2 (%78), v1 (%79), v1 (%80)} |
| %26 (v2) : v2 |
| %32 (v4) -> v2 (%81), v1 (%float_1), v1 (%float_1) |
| %51 (v2) : v2 |
| %52 (v2) : v2 |
| %54 (v4) -> v2 (%52), v2 (%76) |
| %56 (v2) -> v1 (%79), v1 (%80) |
| %58 (v2) -> v1 (%82), v1 (%83) |
| %60 (v4) -> v2 (%52), v1 (%82), v1 (%83) |
| %67 (v4) -> v2 (%52), v1 (%66), v1 (%83) |
| %70 (v4) -> v2 (%84), v1 (%85), v1 (%86) |
| %73 (v4) -> v2 (%87), v1 (%88), v1 (%89) |

FIG. 6E

```
%74 = OpConstantComposite %v2float %float_0 %float_0
%75 = OpConstantComposite %v2float %float_0 %float_0
%76 = OpConstantComposite %v2float %float_0 %float_0
%22 = OpImageSampleImplicitLod %v4float %17 %21
%77 = OpVectorSplit %22 %v2float %78 %float %79 %float %80
%81 = OpCompositeConstruct %v2float %float_1 %float_1
%42 = OpFMul %float %79 %float_255
%46 = OpFAdd %float %42 %80
%51 = OpCompositeConstruct %v2float %float_1 %float_1
%52 = OpFDiv %v2float %78 %51
%82 = OpFMul %float %79 %46
%83 = OpFMul %float %80 %46
%66 = OpFAdd %float %82 %float_1
%84 = OpFAdd %v2float %81 %74
%85 = OpFAdd %float %float_1 %float_0
%86 = OpFAdd %float %float_1 %float_0
%87 = OpFAdd %v2float %52 %84
%88 = OpFAdd %float %66 %85
%89 = OpFAdd %float %83 %86
%90 = OpCompositeConstruct %v4float %87 %88 %89
    OpStore %frag_color %90
```

FAST PARTIAL SCALARIZATION

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, modeling and simulation systems, and so on. These systems may employ a combination of hardware and software technologies to support processing, storage, generation, manipulation and rendition of multimedia information, for example, capture devices, storage devices, communication networks, computer systems, and display devices.

SUMMARY

Various aspects of the described techniques relate to improved methods, systems, devices, and apparatuses that support fast partial scalarization. A device may be configured with one or more graphics processing unit (GPUs), which may represent one or more dedicated processors for performing graphical operations. A GPU may be a dedicated hardware unit having fixed function and programmable components for rendering graphics and executing GPU applications. Various GPU applications may execute source code for a GPU application to improve a rendering operation by the GPU. The source code may include, for example, a shader program. A graphics compiler associated with the GPU may convert the source code (e.g., the shader program) to underlying GPU hardware instructions. The graphics compiler may then perform ongoing improvements (e.g., refinements) to the GPU hardware instructions to reduce a latency of the rendering operation (e.g., by increasing a speed of the rendering operation).

As part of converting the source code (e.g., the shader program) to the GPU hardware instructions, the graphics compiler may initially convert the source code to an intermediate representation. The intermediate representation may be a scalar intermediate representation formed from the graphics compiler segmenting vector instructions into multiple scalar instructions. In using the scalar intermediate representation, compiling time may increase due to a size of the scalar intermediate representation. The use of the vector intermediate representation may increase the complexity of performing the improvements (e.g., optimizations) to the intermediate representation (e.g., of the shader programs) to produce optimized GPU hardware instructions, hence increasing latency for the graphics compiler.

Various aspects of the described techniques relate to configuring a device to support and provide fast partial scalarization. The device may generate a partially scalarized intermediate representation of vectors included in a shader program. For example, the device (e.g., using a graphics compiler) may generate an intermediate representation of vectors included in the shader program. Based on the intermediate representation, the device may determine split information associated with the vectors. The device may associate vectors in the shader program (e.g., determine relationships between vectors) based on vector instructions associated with the vectors (e.g., vector instructions which include the vectors). In some examples, the device may update (e.g., merge) the split information in a relationship table based on the associations (e.g., based on the relationships). Accordingly, the device may generate partially scalarized instructions based on the updated split information. In some aspects, the device may exclude (e.g., delete) subsets of vector instructions from the intermediate representation or introduce new subsets of vector instructions (e.g., of lower dimensionality) and scalar instructions as part of generating the partially scalarized instructions.

A method of graphics processing at a device is described. The method may include generating a representation of a set of vectors and a set of vector instructions associated with the set of vectors, determining information associated with a vector in the set of vectors based on the representation, the information including an indication of splitting the vector and splitting one or more vector instructions associated with the vector, associating the vector to one or more other vectors in the set of vectors based on one or more vector instructions related to the set of vectors, updating the information based on the associating, and generating partially scalarized instructions based on the updating.

An apparatus for graphics processing at a device is described. The apparatus may include a processor, memory coupled with the processor, and instructions stored in the memory. The instructions may be executable by the processor to cause the apparatus to generate a representation of a set of vectors and a set of vector instructions associated with the set of vectors, determine information associated with a vector in the set of vectors based on the representation, the information including an indication of splitting the vector and splitting one or more vector instructions associated with the vector, associate the vector to one or more other vectors in the set of vectors based on one or more vector instructions related to the set of vectors, update the information based on the associating, and generate partially scalarized instructions based on the updating.

Another apparatus for graphics processing at a device is described. The apparatus may include means for generating a representation of a set of vectors and a set of vector instructions associated with the set of vectors, determining information associated with a vector in the set of vectors based on the representation, the information including an indication of splitting the vector and splitting one or more vector instructions associated with the vector, associating the vector to one or more other vectors in the set of vectors based on one or more vector instructions related to the set of vectors, updating the information based on the associating, and generating partially scalarized instructions based on the updating.

A non-transitory computer-readable medium storing code for graphics processing at a device is described. The code may include instructions executable by a processor to generate a representation of a set of vectors and a set of vector instructions associated with the set of vectors, determine information associated with a vector in the set of vectors based on the representation, the information including an indication of splitting the vector and splitting one or more vector instructions associated with the vector, associate the vector to one or more other vectors in the set of vectors based on one or more vector instructions related to the set of vectors, update the information based on the associating, and generate partially scalarized instructions based on the updating.

In some examples of the method, apparatuses, and non-transitory computer-readable medium described herein, generating the partially scalarized instructions may include operations, features, means, or instructions for excluding a subset of vector instructions from the set of vector instructions, and generating one or more additional subsets of vector instructions (e.g. of lower dimensionality) and scalar instructions.

Some examples of the method, apparatuses, and non-transitory computer-readable medium described herein may further include operations, features, means, or instructions for aggregating information of the vector and information of the one or more other vectors. In some aspects, the information of the vector may be associated with a first vector instruction of the one or more vector instructions, and the information of the one or more other vectors may be associated with the first vector instruction or a second vector instruction of the one or more vector instructions. In some aspects, updating the information may be based on the aggregating.

In some examples of the method, apparatuses, and non-transitory computer-readable medium described herein, aggregating information of the vector and information of the one or more other vectors may include operations, features, means, or instructions for aggregating information of the vector and information of the one or more other vectors based on a bitwise operation.

Some examples of the method, apparatuses, and non-transitory computer-readable medium described herein may further include operations, features, means, or instructions for outputting the updated information including the partially scalarized instructions. In some aspects, outputting the updated information including the partially scalarized instructions may include rendering graphics information using one or more shader programs running on the device based on the updated information including the partially scalarized instructions and outputting the rendered graphics information.

Some examples of the method, apparatuses, and non-transitory computer-readable medium described herein may further include operations, features, means, or instructions for scanning the set of vectors or the set of vector instructions associated with the set of vectors, or both, and determining a set of vector operations associated with the set of vectors, the set of vector instructions associated with the set of vectors, the one or more other vectors in the set of vectors, or one or more other vector instructions associated with the one or more other vectors based on the scanning. In some aspects, associating the vector to one or more other vectors in the set of vectors may be based on the set of vector operations.

Some examples of the method, apparatuses, and non-transitory computer-readable medium described herein may further include operations, features, means, or instructions for determining a common vector operation between the set of vector operations. In some aspects, associating the vector to one or more other vectors in the set of vectors may be based on the common vector operation.

Some examples of the method, apparatuses, and non-transitory computer-readable medium described herein may further include operations, features, means, or instructions for aggregating information of the vector and information of an other vector of the one or more other vectors based on the associating. In some aspects, the information of the vector may be associated with a first vector instruction of the one or more vector instructions, and the information of the other vector of the one or more other vectors may be associated with the first vector instruction or a second vector instruction of the one or more vector instructions. In some aspects, updating the information may be based on the aggregating.

Some examples of the method, apparatuses, and non-transitory computer-readable medium described herein may further include operations, features, means, or instructions for scanning the set of vectors or the set of vector instructions associated with the set of vectors, or both, determining a first set of channels associated with the set of vectors or the set of vector instructions associated with the set of vectors, or both, based on the scanning, and determining a second set of channels associated with the set of vectors, the set of vector instructions associated with the set of vectors, the one or more other vectors in the set of vectors, or one or more other vector instructions associated with the one or more other vectors based on the scanning. In some aspects, associating the vector to one or more other vectors in the set of vectors may be based on the first set of channels or the second set of channels, or both.

Some examples of the method, apparatuses, and non-transitory computer-readable medium described herein may further include operations, features, means, or instructions for determining a common vector operation between the first set of channels or the second set of channels, or both. In some aspects, associating the vector to one or more other vectors in the set of vectors may be based on the common vector operation.

Some examples of the method, apparatuses, and non-transitory computer-readable medium described herein may further include operations, features, means, or instructions for aggregating information of the vector and information of an other vector of the one or more other vectors based on the associating. In some aspects, the information of the vector may be associated with a first vector instruction of the one or more vector instructions, and the information of the other vector of the one or more other vectors may be associated with the first vector instruction or a second vector instruction of the one or more vector instructions. In some aspects, updating the information may be based on the aggregating.

Some examples of the method, apparatuses, and non-transitory computer-readable medium described herein may further include operations, features, means, or instructions for determining information associated with an other vector of the one or more other vectors in the set of vectors based on the representation, the information including an indication of splitting the other vector and splitting one or more other vector instructions associated with the other vector. In some aspects, associating the vector to one or more other vectors in the set of vectors may be based on one or more vector instructions related to the set of vectors or the one or more other vector instructions associated with the other vector, or both.

Some examples of the method, apparatuses, and non-transitory computer-readable medium described herein may further include operations, features, means, or instructions for identifying one or more shader programs running on the device. In some aspects, generating the representation of the set of vectors and the set of vector instructions may be based on the identifying.

In some examples of the method, apparatuses, and non-transitory computer-readable medium described herein, the one or more shader programs includes the set of vectors and the set of vector instructions.

Some examples of the method, apparatuses, and non-transitory computer-readable medium described herein may further include operations, features, means, or instructions for converting, using a graphics compiler associated with the device, one or more shader programs into the representation of the set of vectors and the set of vector instructions associated with the set of vectors. In some aspects, the representation includes an intermediate representation.

In some examples of the method, apparatuses, and non-transitory computer-readable medium described herein, the intermediate representation includes a data structure or a code representing a source code for a graphics application running on the device.

BRIEF DESCRIPTION OF THE DRAWINGS

FIGS. 4A through 4C illustrate examples of vector splits that support fast partial scalarization in accordance with aspects of the present disclosure.

FIGS. 6A through 6F illustrate examples that support fast partial scalarization in accordance with aspects of the present disclosure.

DETAILED DESCRIPTION

Figure 1:
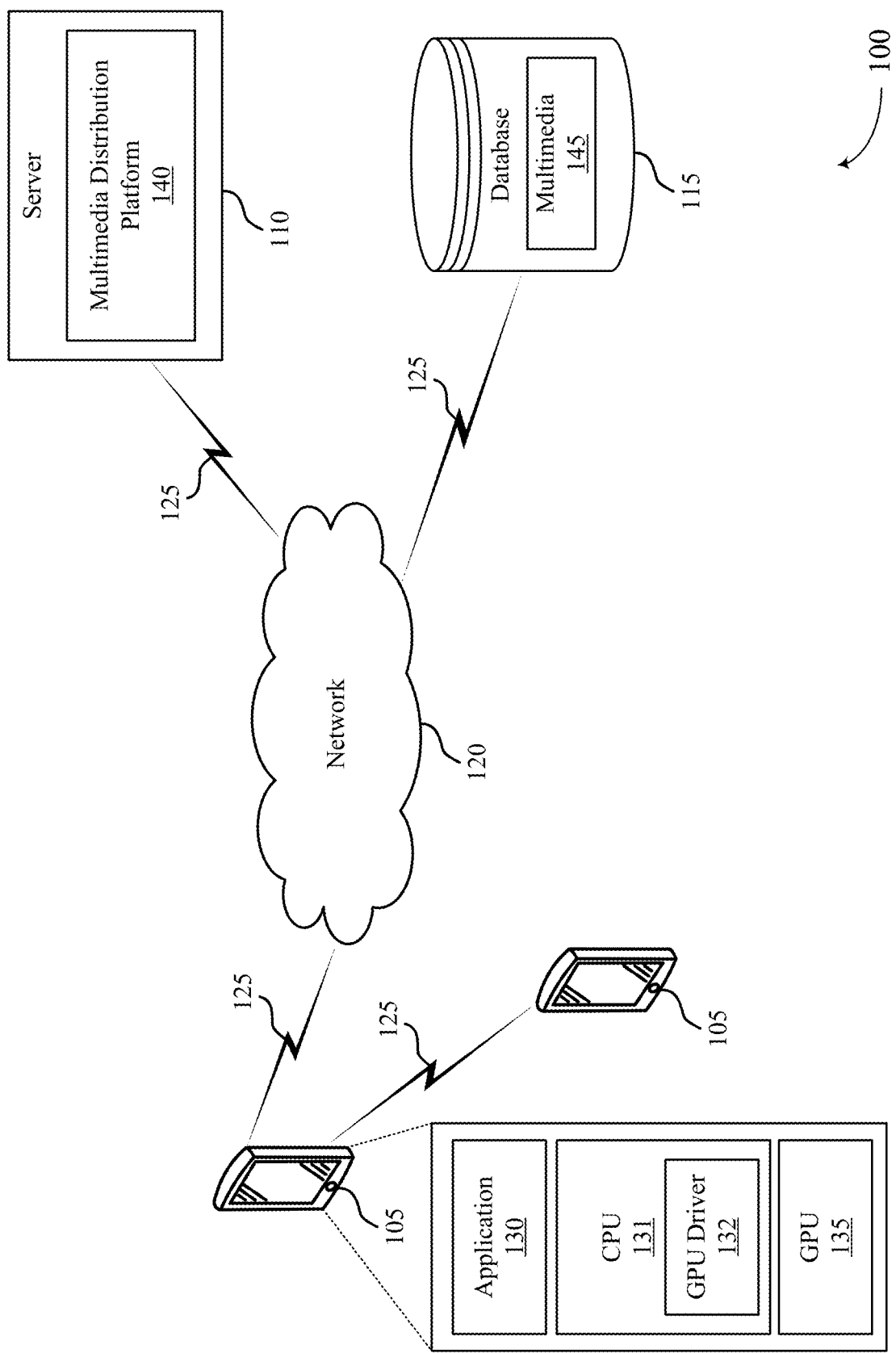
FIG. 1 illustrates an example of a multimedia system for graphics processing that supports fast partial scalarization in accordance with aspects of the present disclosure.

A graphics processing unit (GPU) may represent one or more dedicated processors for performing graphical operations. A GPU may be a dedicated hardware unit having fixed function and programmable components for rendering graphics and executing GPU applications. Various graphics applications may execute a shader program to improve a rendering operation by the GPU. The shader programs may, in some cases, be executed on programmable parallel cores of the GPU. The shader programs may, in some cases, be written or coded using graphics languages or application program interfaces (APIs), such as OpenGL, Vulkan, DX, etc. Graphics languages may provide vector datatypes for performing matrix and vector operations which may implement different transformations on vertices of polygons. The transformations may provide for simulations of physics as well graphical effects such as shading, lighting, texturing, shadows, etc.

Vectors of the vector datatypes may be four channels wide (e.g., a 4-dimensional vector), three channels wide (e.g., a 3-dimensional vector), and two channels wide (e.g., a 2-dimensional vector) and may be referred to as vec4, vec3, and vec2, respectively. In some cases, vec4, vec3, and vec2 may respectively be referred to as v4, v3, and v2. In some cases, a scalar may be referred to as vec1 or v1 as if it were a vector which is one channel wide (e.g., a 1-dimensional vector).

Vector channels may include an X channel, a Y channel, a Z channel, and a W channel. Availability of the vector channels may be based on data types included in a shader program. The X channel may be available on all vector data types, the Y channel may be available on all vector data types with a size greater than one, the Z channel may be available on all vector data types with a size greater than two, and the W channel may be available on vec4 or color data types. The X channel, Y channel, Z channel, and W channel may be referred to as an R channel, a G channel, a B channel, and an A channel, respectively.

A GPU may access channels of the vectors by a swizzle operation. In an example case, a swizzle operation for accessing a third channel of a vec4 named "foo" (e.g., expressed as a high-level source code representation) would be "foo.z". In some cases of performing a swizzle operation on an input vector, the GPU may generate an output vector of the same dimension as the input vector. The channels of the output vector may be the same as the channels of the input vector but may be in a different channel order. Some shader programs may include a combination of vector and scalar operations. A GPU may access parts (e.g., channels) of a vector (e.g., via a swizzle operation or swizzle node) and use the parts of the vector in further vector or scalar operations.

A graphics compiler associated with the GPU may, in some examples, convert the shader program to underlying GPU hardware instructions. The graphics compiler may also perform ongoing improvements to the GPU hardware instructions to increase a rate of the rendering operation. In converting the shader program to the GPU hardware instructions, the graphics compiler may initially convert the program to an intermediate representation. The graphics compiler may perform multiple refinements on the intermediate representation. In some cases, the graphics compiler may traverse the entirety of the intermediate representation multiple times in performing the refinements.

The intermediate representation may be a scalar intermediate representation formed from the graphics compiler segmenting vector instructions into multiple scalar instructions. For example, the intermediate representation may be entirely scalar such that the vector instructions are expressed as multiple scalar instructions. In some cases, the intermediate representation may be a vector intermediate representation that maintains all vector instructions. In using a scalar intermediate representation of shader programs, compiling time may rise due to a magnitude of the scalar intermediate representation. The use of a vector intermediate representation of shader programs may increase the complexity of performing the refinements thereof, hence increasing latency for the graphics compiler. In some cases, use of a vector intermediate representation may include writing a new set of channel-aware refinements (e.g. optimizations), hence increasing complexity and overhead.

Various aspects of the described techniques relate to configuring device to support and provide fast partial scalarization. The device may generate a partially scalarized intermediate representation of vectors included in a shader program. For example, a device (e.g., using a graphics compiler) may generate an intermediate representation of vectors included in a shader program. Based on the intermediate representation, the device may determine split information associated with the vectors. The device may associate vectors in the shader program (e.g., determine relationships between vectors) based on vector instructions associated with the vectors (e.g., vector instructions which include the vectors). The device may add associated vectors to the relationship table. In some examples, the device may update (e.g., merge) the split information in a relationship table based on the associations (e.g., based on the relationships). Accordingly, the device may generate partially scalarized instructions based on the updated split information. In some aspects, the device may exclude (e.g., delete) or subsets of vector instructions from the intermediate representation or introduce new subsets of vector instructions (e.g., of lower dimensionality) and scalar instructions as part of generating the partially scalarized instructions.

Particular aspects of the subject matter described in this disclosure may be implemented to realize one or more of the following potential improvements, among others. The techniques employed by the device may provide benefits and enhancements to GPU rendering operations by the device. For example, operations performed by the device may provide improvements to partial scalarization. In some examples, configuring the device to support fast partial scalarization, among other examples in GPU systems, may support improvements in power consumption, resource usage, and reduced latency, among other benefits.

Aspects of the disclosure are initially described in the context of a multimedia system. Aspects of the disclosure are further illustrated by and described with reference to apparatus diagrams, system diagrams, and flowcharts that relate to fast partial scalarization.

FIG. 1 illustrates an example of a multimedia system 100 that supports fast partial scalarization in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports fast partial scalarization, such as multimedia packets, multimedia data, or multimedia control information, via network 120 using communications links 125. In some cases, a portion or all of the techniques described herein supporting fast partial scalarization may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130, a CPU 131, and a GPU 135. While, the multimedia system 100 illustrates the devices 105 including the application 130, the CPU 131, and the GPU 135, the application 130, the CPU 131, and the GPU 135 may be optional features for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The CPU 131 may be part of a general-purpose processor, a digital signal processor (DSP), an image signal processor (ISP), a central processing unit (CPU), a microcontroller, an application-specific integrated circuit (ASIC), a field-programmable gate array (FPGA), a system-on-chip (SOC), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. In some cases, a GPU driver 132 may be integrated into the CPU 131. The GPU driver 132 may be an example of the GPU driver 220, the GPU driver 718, the GPU driver 805, and the GPU driver 945 described herein.

The GPU driver 132 may process multimedia (e.g., image data, video data, audio data) from and/or write multimedia data to a local memory of the device 105 or to the database 115. For example, the GPU driver 132 may be configured to process multimedia data (e.g., shader programs) to support fast partial scalarization, according to the techniques described herein. The GPU driver 132 may generate a representation of a set of vectors and a set of vector instructions associated with the set of vectors. The GPU driver 132 may determine information associated with a vector in the set of vectors based on the representation, the information including an indication of splitting the vector and splitting one or more vector instructions associated with the vector. In some aspects, the GPU driver 132 may associate the vector to one or more other vectors in the set of vectors based on one or more vector instructions related to the set of vectors. In some example aspects, the GPU driver 132 may update the information based on the associating and generate partially scalarized instructions based on the updating.

The GPU 135 may be part of a general-purpose processor, a DSP, an ISP, a CPU, a microcontroller, an ASIC, an FPGA), an SOC, a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the GPU 135 may process multimedia (e.g., image data, video data, audio data) from and/or write multimedia data to a local memory of the device 105 or to the database 115. The GPU 135 may be configured to process multimedia data (e.g., shader programs) to support fast partial scalarization, according to the techniques described herein.

The multimedia system 100 may support and provide techniques for achieving a partially scalarized intermediate representation of a shader program. In some aspects, generating the partially scalarized intermediate representation of the shader program may include maintaining vectors (e.g., keeping vectors intact) having channels which are accessed based in part on a vector order with regards to other vectors in participating instructions. In some aspects, generating the partially scalarized intermediate representation of the shader program may include splitting vectors having channels used in a non-uniform manner (e.g., based on a vector order), for example, by splitting vectors based on use or function of the scalars or vectors.

For example, the device 105 may generate an intermediate representation of vectors included in source code for a graphics application (e.g., a shader program). Based on the intermediate representation, the device 105 may determine information (e.g., split information) associated with the vectors. The information (e.g., split information) may include an indication of splitting the vectors and splitting vector instructions associated with the vectors. The device 105 may associate vectors in the shader program (e.g., determine relationships between vectors) based on vector instructions related to the vectors.

In some examples, the device 105 may add associated vectors to the relationship table. In some examples, the device 105 may update (e.g., merge) the information (e.g., the split information) of vectors in a relationship table based on the associations (e.g., based on the relationships). The device 105 may generate partially scalarized instructions based on the updated split information. In some aspects, the device 105 may exclude (e.g., delete) subsets of vector instructions from the intermediate representation or introduce new subsets of vector instructions (e.g., of lower dimensionality) and scalar instructions as part of generating the partially scalarized instructions. The device 105 may output the updated information including the partially scalarized instructions. For example, the device 105 may render graphics information using one or more shader programs running on the device 105 based on the updated information including the partially scalarized instructions and output the rendered graphics information.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support fast partial scalarization associated with the multimedia 145. The device 105 may retrieve the stored data from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The multimedia system 100 may thus provide improvements in fast partial scalarization. The multimedia system 100 may also provide benefits and enhancements to the operation of the devices 105. For example, the devices 105 may be configured to generate a partially scalarized intermediate representation including both scalar instructions and vector instructions, which may improve operational characteristics such as power consumption, processor utilization (e.g., DSP, CPU, GPU, ISP processing utilization), higher program execution speed, and memory usage of the devices 105. The devices 105 may also be configured to provide partially scalarized intermediate representation having advantages of reduced memory usage and reduced latency (e.g., GPU compile times) compared to fully scalarized intermediate representations. In some aspects, the multimedia system 100 may provide for refinements (e.g., optimizations) of scalar instructions and vector instructions regardless of channel awareness, which may provide for improved processing time and improved execution time due to refinements.

Figure 2:
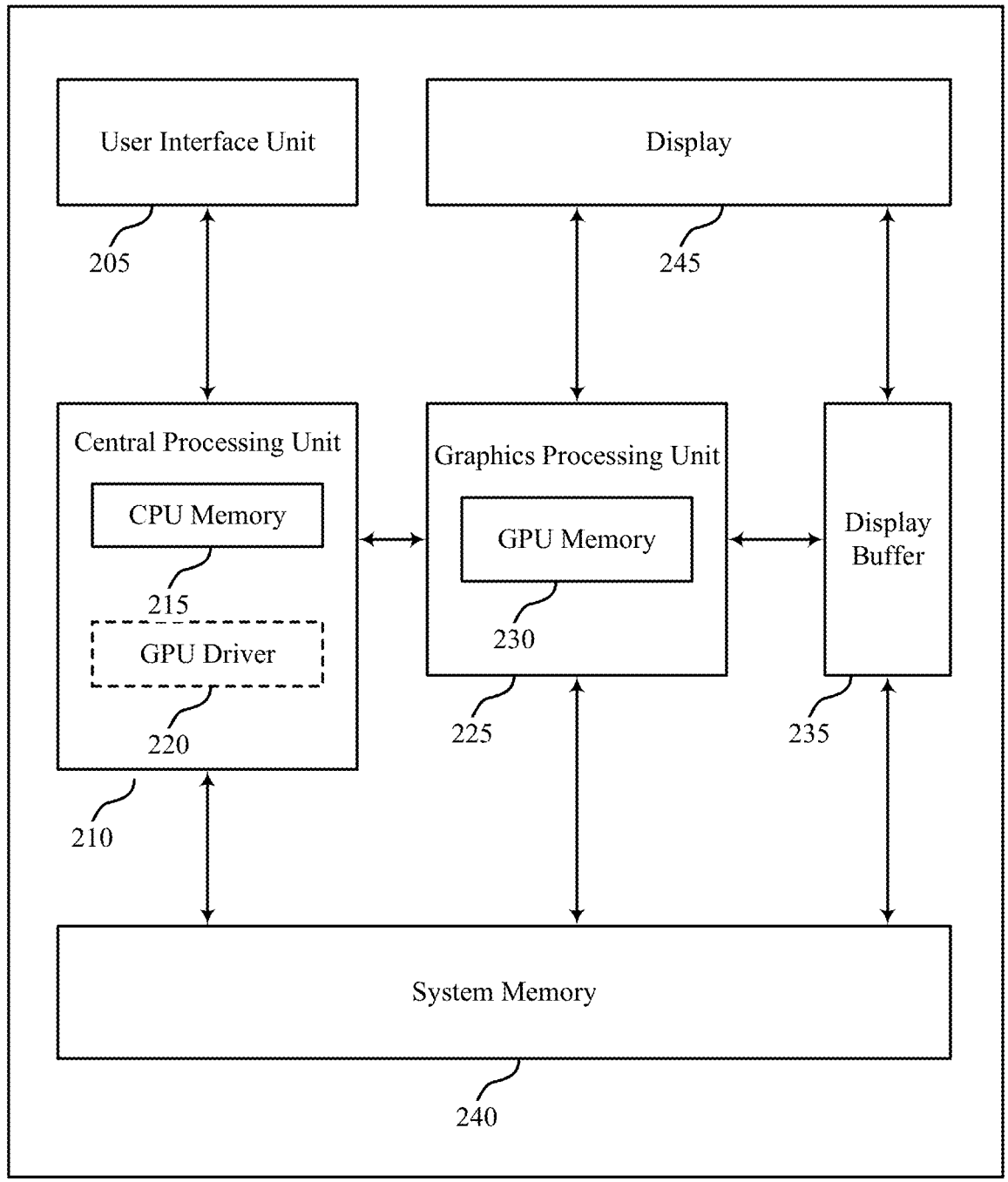
FIG. 2 illustrates an example of a device that supports fast partial scalarization in accordance with aspects of the present disclosure.

FIG. 2 illustrates an example of a device 200 that supports fast partial scalarization in accordance with aspects of the present disclosure. In some examples, the device 200 may implement aspects of the multimedia system 100. For example, the device 200 may implement aspects of fast partial scalarization performed by a device 105 as described with reference to FIG. 1. Examples of the device 200 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 2, the device 200 may include a central processing unit (CPU) 210 having CPU memory 215, a GPU 225 having GPU memory 230, a display 245, a display buffer 235 storing data associated with rendering, a user interface unit 205, and a system memory 240. For example, the system memory 240 may store a GPU driver 220 (illustrated as being contained within the CPU 210 as described herein) having a compiler, a GPU program, a locally-compiled GPU program, and the like. The user interface unit 205, CPU 210, GPU 225, display buffer 235, system memory 240, and display 245 may communicate with each other (e.g., using a system bus).

Examples of the CPU 210 include, but are not limited to, a digital signal processor (DSP), general purpose microprocessor, ASIC, an FPGA, or other equivalent integrated or discrete logic circuitry. Although the CPU 210 and the GPU 225 are illustrated as separate units in the example of FIG. 2, in some examples, the CPU 210 and GPU 225 may be integrated into a single unit. The CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via the display 245. As illustrated, the CPU 210 may include CPU memory 215. For example, the CPU memory 215 may represent on-chip storage or memory used in executing machine or object code. The CPU memory 215 may include one or more volatile or non-volatile memories or storage devices, such as flash memory, a magnetic data media, an optical storage media, etc. The CPU 210 may be able to read values from or write values to the CPU memory 215 more quickly than reading values from or writing values to the system memory 240, which may be accessed, e.g., over a system bus.

In some examples, the GPU 225 may be an example of aspects of the GPU 135 described herein. The GPU 225 may represent one or more dedicated processors for performing graphical operations. That is, for example, the GPU 225 may be a dedicated hardware unit having fixed function and programmable components for rendering graphics and executing GPU applications. The GPU 225 may also include a DSP, a general purpose microprocessor, an ASIC, an FPGA, or other equivalent integrated or discrete logic circuitry. The GPU 225 may be built with a highly-parallel structure that provides more efficient processing of complex graphic-related operations than the CPU 210. For example, the GPU 225 may include a plurality of processing elements that are configured to operate on multiple vertices or pixels in a parallel manner. The highly parallel nature of the GPU 225 may allow the GPU 225 to generate graphic images (e.g., graphical user interfaces and two-dimensional or three-dimensional graphics scenes) for the display 245 more quickly than the CPU 210.

The GPU 225 may, in some instances, be integrated into a motherboard of device 200. In other instances, the GPU 225 may be present on a graphics card that is installed in a port in the motherboard of the device 200 or may be otherwise incorporated within a peripheral device configured to interoperate with the device 200. As illustrated, the GPU 225 may include GPU memory 230. For example, the GPU memory 230 may represent on-chip storage or memory used in executing machine or object code. GPU memory 230 may include one or more volatile or non-volatile memories or storage devices, such as flash memory, a magnetic data media, an optical storage media, etc. The GPU 225 may be able to read values from or write values to the GPU memory 230 more quickly than reading values from or writing values to system memory 240, which may be accessed, e.g., over a system bus. That is, the GPU 225 may read data from and write data to the GPU memory 230 without using the system bus to access off-chip memory. This operation may allow the GPU 225 to operate in a more efficient manner by reducing the need for the GPU 225 to read and write data via the system bus, which may experience heavy bus traffic.

The display 245 represents a unit capable of displaying video, images, text or any other type of data for consumption by a viewer. The display 245 may include a liquid-crystal display (LCD), a light emitting diode (LED) display, an organic LED (OLED), an active-matrix OLED (AMOLED), or the like. The display buffer 235 represents a memory or storage device dedicated to storing data for presentation of imagery, such as computer-generated graphics, still images, video frames, or the like for the display 245. The display buffer 235 may represent a two-dimensional buffer that includes a plurality of storage locations. The number of storage locations within the display buffer 235 may, in some cases, correspond to the number of pixels to be displayed on the display 245. For example, if the display 245 is configured to include 640×480 pixels, the display buffer 235 may include 640×480 storage locations storing pixel color and intensity information, such as red, green, and blue pixel values, or other color values. The display buffer 235 may store the final pixel values for each of the pixels processed by GPU 225. The display 245 may retrieve the final pixel values from the display buffer 235 and display the final image based on the pixel values stored in the display buffer 235.

The user interface unit 205 represents a unit with which a user may interact with or otherwise interface to communicate with other units of the device 200, such as the CPU 210. Examples of the user interface unit 205 include, but are not limited to, a trackball, a mouse, a keyboard, and other types of input devices. The user interface unit 205 may also be, or include, a touch screen and the touch screen may be incorporated as part of the display 245. In some cases, the user interface unit 205 may be an example of the I/O controller 915 as described with reference to FIG. 9.

The system memory 240 may comprise one or more computer-readable storage media. Examples of the system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. The system memory 240 may store program modules and/or instructions that are accessible for execution by CPU 210. Additionally, the system memory 240 may store user applications and application surface data associated with the applications. The system memory 240 may in some cases store information for use by and/or information generated by other components of device 200. For example, the system memory 240 may act as a device memory for the GPU 225 and may store data to be operated on by the GPU 225 as well as data resulting from operations performed by the GPU 225.

In some examples, the system memory 240 may include instructions that cause the CPU 210 or GPU 225 to perform the functions ascribed to the CPU 210 or GPU 225 in aspects of the present disclosure. The system memory 240 may, in some examples, be considered as a non-transitory storage medium. The term "non-transitory" should not be interpreted to mean that the system memory 240 is non-movable. As one example, the system memory 240 may be removed from device 200 and moved to another device. As another example, a system memory substantially similar to the system memory 240 may be inserted into the device 200. In certain examples, a non-transitory storage medium may store data that can, over time, change (e.g., in RAM).

The system memory 240 may store a GPU driver 220 and compiler, a GPU program, and a locally-compiled GPU program. The GPU driver 220 may represent a computer program or executable code that provides an interface to access the GPU 225. The CPU 210 may execute the GPU driver 220 or portions thereof to interface with the GPU 225 and, for this reason, the GPU driver 220 is shown in the example of FIG. 2 within the CPU 210. The GPU driver 220 may be accessible to programs or other executables executed by the CPU 210, including the GPU program stored in the system memory 240. Thus, when one of the software applications executing on the CPU 210 requires graphics processing, the CPU 210 may provide graphics commands and graphics data to the GPU 225 for rendering to the display 245 (e.g., via the GPU driver 220).

In some cases, the GPU program may include code written in a high level (HL) programming language, e.g., using an API. Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, the CPU 210 may issue one or more rendering commands to the GPU 225 (e.g., through the GPU driver 220) to cause the GPU 225 to perform some or all of the rendering of the graphics data. In some examples, the graphics data to be rendered may include a list of graphics primitives (e.g., points, lines, triangles, quadrilaterals, etc.).

The GPU program stored in the system memory 240 may invoke or otherwise include one or more functions provided by the GPU driver 220. The CPU 210 executes the program in which the GPU program is embedded and, upon encountering the GPU program, passes the GPU program to the GPU driver 220. The CPU 210 executes the GPU driver 220 in this context to process the GPU program. That is, for example, the GPU driver 220 may process the GPU program by compiling the GPU program into object or machine code executable by the GPU 225. This object code may be referred to as a locally-compiled GPU program.

In some examples, a compiler associated with the GPU driver 220 may operate in real-time or near-real-time to compile the GPU program during the execution of the program in which the GPU program is embedded. For example, the compiler represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In some aspects, the GPU driver 220 (e.g., a graphics compiler associated with the GPU 225) may generate an intermediate representation of vectors included in source code for a graphics application (e.g., a shader program). Based on the intermediate representation, the GPU driver 220 may determine information (e.g., split information) associated with the vectors. The information (e.g., split information) may include an indication of splitting the vectors and splitting vector instructions associated with the vectors. The GPU driver 220 may associate vectors in the shader program (e.g., determine relationships between vectors) based on vector instructions related to the vectors. In some examples, the GPU driver 220 may update (e.g., merge) the information (e.g., the split information) of vectors in a relationship table based on the associations (e.g., based on the relationships). For example, the GPU driver 220 may add associated vectors to the relationship table. Accordingly, the GPU driver 220 may generate partially scalarized instructions based on the updated split information. In some aspects, the GPU driver 220 may exclude (e.g., delete) subsets of vector instructions from the intermediate representation or introduce new subsets of vector instructions (e.g., of lower dimensionality) and scalar instructions as part of generating the partially scalarized instructions.

Figure 3:
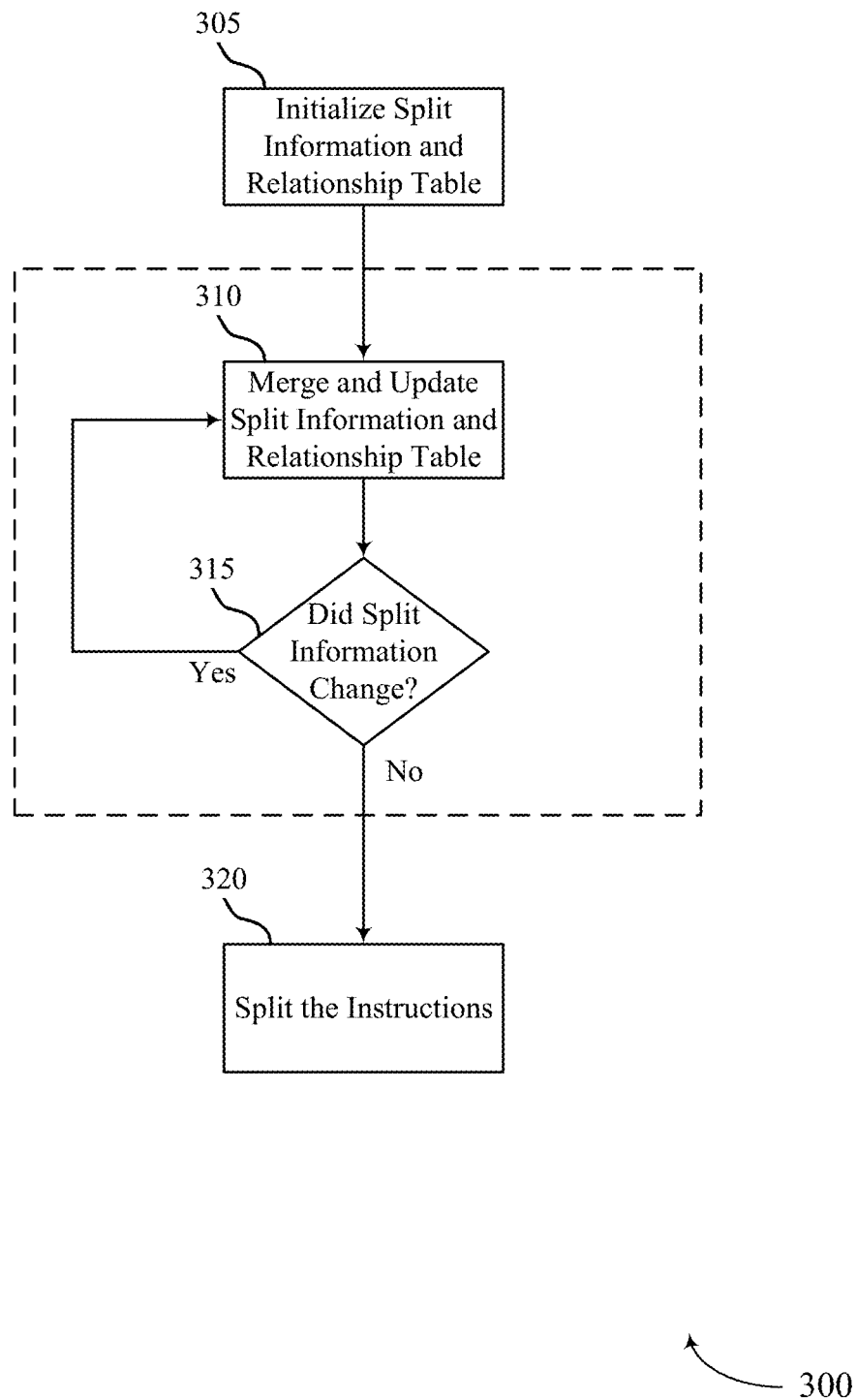
FIG. 3 illustrates an example of a process flow that supports fast partial scalarization in accordance with aspects of the present disclosure.

FIG. 3 illustrates an example of a process flow 300 that supports fast partial scalarization in accordance with aspects of the present disclosure. In some examples, the process flow 300 may implement aspects of multimedia system 100. For example, the process flow 300 may be based on a configuration by a device 105, and implemented by the device 105, for reduced power consumption, improved resource utilization, and may promote low latency for GPU rendering operations, among other benefits. In the following description of the process flow 300, the operations may be performed in a different order than the example order shown, or the operations may be performed in different orders or at different times. Some operations may also be omitted from the process flow 300, and other operations may be added to the process flow 300.

At 305, the device 105 may initialize split information and a relationship table associated with vectors and vector instructions. In an example, the device 105 may generate an intermediate representation of a set of vectors and a set of vector instructions associated with the set of vectors. For example, the device 105 may identify source code (e.g., shader programs) for a graphics application running on the device 105. The shader programs may each include vectors and vector instructions. In some aspects, the device 105 may convert, using a graphics compiler associated with the device 105, one or more of the shader programs into an intermediate representation. The intermediate representation may include vectors and vector instructions associated with the vectors. In some aspects, the intermediate representation may include a data structure or a code representing the source code for the graphics application running on the device 105.

In some aspects, based on the intermediate representation, the device 105 may determine split information including an indication of splitting the vectors and splitting vector instructions associated with the vectors. When initializing the split information and the relationship table at 305, the device 105 may, in some examples, determine initial split information of the vectors included in the source code (e.g., the shader program). For example, the device 105 may scan vector instructions in the source code (e.g., the shader program). In some aspects, the device 105 may scan vectors associated with the vector instructions. For one or more of the vector instructions, the device 105 may determine a first set of split information for the vectors defined in the vector instructions (e.g., how to split the vectors), for example, based on use information of the defined vectors. The device 105 may record (e.g., store) the first set of split information in the relationship table.

In some other aspects, the device 105 may determine a second set of split information for the vectors defined in the vector instructions based on, for example, an association between vectors included among different sets of vector instructions in the source code (e.g., based on use of vectors included among different sets of vector instructions in the source code). In some aspects, the device 105 may determine the second set of split information, for example, without basing the determination on the functions or operations of the vector instructions. The device 105 may store the second set of split information in the relationship table. The determined initial split information may include the first and second sets of split information.

The device 105 may associate vectors (e.g., a first set of vectors in a first set of vector instructions, a second set of vectors in a second set of vector instructions) in the sets of vectors based on vector instructions related to the sets of vectors. For example, the device 105 may determine relationships (e.g., common vector operations) from among vector operations of the same set of vector instructions or different sets of vector instructions. In an example, the device 105 may determine the split information for the first set of vectors and the second set of vectors based on the determined relationships (e.g., common vector operations) among the vector operations of the same set of vector instructions (e.g., the first set of vector instructions, or the second set of vector instructions). In an example, the device 105 may determine the split information based on the determined relationships (e.g., common vector operations) among the vector operations of different sets of vector instructions (e.g., the first set of vector instructions and the second set of vector instructions). In an example aspect, a vector "foo" and a vector "bar" involved in a vector operation "add" (e.g., the vectors are added together according to a vector operation "add") may have an association with each other. For example, the device 105 may associate the vectors based on the vector operation "add".

In some examples, the device 105 may determine relationships (e.g., common vector operations) between channels of the same set of vector instructions or channels of different sets of vector instructions. In an example, the device 105 may determine the split information for the first set of vectors and the second set of vectors based on the determined relationships (e.g., common vector operations) between the channels of the same set of vector instructions (e.g., the first set of vector instructions, or the second set of vector instructions). In an example, the device 105 may determine the split information based on the determined relationships (e.g., common vector operations) between the channels of different sets of vector instructions (e.g., the first set of vector instructions and the second set of vector instructions). In some examples, for each vector operation, the device 105 may associate vectors based on vectors having channels involved in the same vector operation. For example, for channels X and Y of a vector "foo" added to channels X and Y of a vector "bar" according to a vector operation "add", the vectors may have an association with each other based on the vector operation "add".

At 310, the device 105 may merge and update (e.g., modify) the split information (e.g., the first and second sets of split information) determined at 305. In some examples, the device 105 may add associated vectors to the relationship table. In some aspects, the device 105 may update the relationship table based on the merging and updating of the split information. In an example aspect, the device 105 may traverse the relationship table, and for each relationship in the table, merge and update the split information of vectors included in the relationship. In an example, the device 105 may identify that the first vector and the second vector are included in a relationship in the table, and the device 105 may merge and update the split information of the first vector and the split information of the second vector (e.g., the first and second sets of split information).

In some example aspects, the device 105 may update the split information, for example, by aggregating the split information of the first vector and the split information of the second vector (e.g., the first and second sets of split information) included in the intermediate representation. For example, referring to the first set of vector instructions and the second set of vector instructions (which respectively include the first set of vectors and the second set of vectors), the device 105 may update the split information by aggregating the split information of the first vector and the split information of the second vector (e.g., the first and second sets of split information). In some aspects, the device 105 may aggregate the split information of vectors included in the intermediate representation based on associations between the vectors, aspects of which are described herein. The device 105 may aggregate the split information, for example, based on a bitwise operation. In some aspects, the device 105 may merge the split information based on a bitwise AND operation. In some example aspects, the device 105 may merge and update the split information of individual vectors based on encoding techniques. For example, the device 105 may merge and update the split information of individual vectors based on Swizzle Pal Information Encoding (SPIE), aspects of which are described with reference to FIGS. 4A through 4C and FIGS. 5A through 5C.

The device 105 may repeat the merging and updating of the split information and the relationship table (e.g., iteratively), for example, until the device 105 traverses the relationship table and identifies that the split information has not been changed (e.g., the device 105 does not merge and update the split information for any vectors). For example, at 315, the device 105 may determine whether any split information has changed. In an example where the device 105 determines split information has changed (e.g., Yes), the device 105 may return to 310. In an example where the device 105 determines split information has not changed (e.g., No), the device 105 may proceed to 320. Based on merging and updating of the split information and the relationship table (e.g., at 310) and determining whether any split information has changed (e.g., at 315), the device 105 may output updated split information (e.g., final split information).

At 320, the device 105 may split the vector instructions included in the intermediate representation based on the updated split information (e.g., the final split information). In some aspects, the device 105 may generate partially scalarized instructions (e.g., a partially scalarized intermediate representation) based on the updated split information (e.g., based on splitting the vector instructions). In some aspects, the device 105 may exclude a subset of vector instructions from the set of vector instructions. In some example aspects, the device 105 may generate one or more additional subsets of vector instructions. In some examples, the one or more additional subsets of vector instructions may have a lower dimensionality compared to the set of vector instructions subject to the split. In some example aspects, the device 105 may generate one or more additional subsets of scalar instructions. For example, the device 105 may delete some vector instructions from the intermediate representation and generate partially scalarized instructions (e.g., based on splitting the vector instructions). The device 105 may output the updated information including the partially scalarized instructions. For example, the device 105 may render graphics information using one or more shader programs running on the device 105 based on the updated information including the partially scalarized instructions and output the rendered graphics information.

FIGS. 4A through 4C illustrate examples 400 through 402 of vector splits that support fast partial scalarization in accordance with aspects of the present disclosure. The examples 400 through 402 may implement aspects of the multimedia system 100, the device 200, and the process flow 300. The examples 400 through 402 illustrate example vector splits of vector types (vec2 (v2), vec3 (v3), vec4 (v4)) and corresponding encodings under SPIE. The example 400 with reference to FIG. 4A illustrates vector splits and corresponding encodings for a vec4. The example 401 with reference to FIG. 4B illustrates vector splits and corresponding encodings for a vec3. The example 402 with reference to FIG. 4C illustrates vector splits and corresponding encodings for a vec2.

According to examples of aspects described herein, SPIE may include encoding techniques for merging and updating the split information of vectors (e.g., individual vectors). In some aspects, SPIE may support the encoding of each channel of a vector (or vectors) separately. In some examples, SPIE may support the application of the same encoding scheme for each channel of a vector, irrespective of vector type associated with the channels (e.g., irrespective of whether a channel belongs to a vec2, a vec3, or a vec4). For example, according to some aspects of SPIE, encoding schemes may provide the split information of vectors by describing how a channel is connected with neighboring channels (e.g., whether the channel and the neighboring channels are accessed together or separately). In an example in which a channel is connected with an adjacent channel (e.g., such that the channels are accessed together), SPIE may classify or consider the channels as "pals".

According to example aspects of SPIE, a decimal value of 0 (binary: 00) may indicate that a channel is "fully split". For example, a decimal value of 0 (binary: 00) may indicate that the channel is not connected with (e.g., is not accessed together with, is not a "pal" of) an adjacent channel. A decimal value of 1 (binary: 01) may indicate that a channel is connected with (e.g., is accessed together with, is a "pal" of) a neighboring channel to the right of the channel (e.g., to form a vec2 or higher, for example, depending on how the neighboring channel is connected with a neighboring channel thereof). In some aspects, the decimal value of 1 (binary: 01) may indicate that the channel is not connected with a neighboring channel to the left of the channel. A decimal value of 2 (binary: 10) may indicate that a channel is connected with (e.g., is accessed together with, is a "pal" of) a neighboring channel to the left of the channel. In some aspects, the decimal value of 2 (binary: 10) may indicate that the channel is not connected with a neighboring channel to the right of the channel. A decimal value of 3 (binary: 11) may indicate that a channel is connected with (e.g., is accessed together with, is a "pal" of) a neighboring channel to the left of the channel and a neighboring channel to the right of the channel.

Figure 5A:
FIGS. 5A through 5C illustrate examples of merging split information that support fast partial scalarization in accordance with aspects of the present disclosure.
Figure 5B:
Figure 5C:

FIGS. 5A through 5C illustrate examples 500 through 502 of merging split information that supports fast partial scalarization in accordance with aspects of the present disclosure. The examples 500 through 502 may implement aspects of the multimedia system 100, the device 200, and the process flow 300. The examples 500 through 502 may include aspects of 310 described with reference to FIG. 3. In some aspects, the examples 500 through 502 illustrate merging of split information based on a bitwise AND operation on SPIE encodings. For example, with reference to FIGS. 1 and 5A through 5C, a device 105 may merge the split information of different channels of vectors in a relationship (e.g., vectors having an association, for example, based on common vector operations). The device 105 may merge the split information based on a bitwise AND operation on the SPIE encodings. The device 105 may then update the SPIE encodings based on merging the split information. In some aspects, the SPIE encodings may convey an indication of the split information.

In the example of FIG. 5A, the device 105 may merge a first row of SPIE encodings (e.g., a (v2, v2) split) with a second row of SPIE encodings (e.g., a (v3, v1) split). The third row may be an example result (e.g., a (v2, v1, v1) split) of a bitwise AND operation on the SPIE encodings of the first and second rows. Referring still to the example 500 in FIG. 5A, two 4-channel vectors (which may be referred to as vec4 or v4) may be in a relationship. The channels may include an X channel, a Y channel, a Z channel, and a W channel. The first 4-channel vector (e.g., which may be referred to as "foo") corresponds to a first row of SPIE encodings in the example 500. Based on the SPIE encoding, the first 4-channel vector (e.g., "foo") is indicated to be split into two 2-channel vectors (which may each be referred to as vec2 or v2). The second 4-channel vector (e.g., which may be referred to as "bar") corresponds to a second row of SPIE encodings in the example 500.

Based on the SPIE encoding, the second 4-channel vector (e.g., "bar") is indicated to be split into a 3-channel vector (which may be referred to as vec3 or v3) and a 1-channel vector (which may be referred to as vec1, v1, or a scalar). The device 105 may merge the split information of the first 4-channel vector (e.g., "foo") and the second 4-channel vector (e.g., "bar") using a bitwise AND operation. The device 105 may then update the SPIE encodings (e.g., update the split information) based on merging the split information. In the example of FIG. 5A, based on the bitwise AND operation, the updated split information in the third row of SPIE encodings may indicate one 2-channel vector (which may be referred to as vec2 or v2) and two scalars (which may each be referred to as vec1 or v1).

In the example of FIG. 5B, two 4-channel vectors (which may each be referred to as vec4 or v4) may be in a relationship. The channels may include an X channel, a Y channel, a Z channel, and a W channel. The device 105 may merge a first row of SPIE encodings (e.g., a (v4) split) with a second row of SPIE encodings (e.g., a (v1, v2, v1) split), in the example of FIG. 5B. The third row may be an example result (e.g., a (v1, v2, v1) split) of a bitwise AND operation on the SPIE encodings of the first and second rows. Referring to FIG. 5C, two 3-channel vectors (which may each be referred to as vec3 or v3) may be in a relationship. The channels may include an X channel, a Y channel, and a Z channel. Here, the device 105 may merge a first row of SPIE encodings (e.g., a (v2, v1) split) with a second row of SPIE encodings (e.g., a (v1, v2) split). The third row may be an example result (e.g., a (v1, v1, v1) split) of a bitwise AND operation on the SPIE encodings of the first and second rows.

The techniques described herein may provide fast partial scalarization associated with generating an intermediate representation from source code (e.g., a shader program). Aspects of the techniques described herein may provide improved efficiency over some techniques which may include recursively iterating over an intermediate representation, consulting use-def information (e.g., a use-define chain), and updating the intermediate representation.

FIGS. 6A through 6F illustrate examples 600 through 604 that support fast partial scalarization in accordance with aspects of the present disclosure. The examples 600 through 604 may implement aspects of the multimedia system 100, the device 200, and the process flow 300. FIG. 6A illustrates an example of an initial intermediate representation 600 of a set of vectors and a set of vector instructions generated by the device 105 based on a source code (e.g., a shader program) according to the example techniques described herein, before implementing fast partial scalarization. FIG. 6B illustrates an example relationship table 601-a, encoding information 602-a, and split information 603-a generated by the device 105 (e.g., at 305 described with respect to FIG. 3) based on the initial intermediate representation 600 before implementing fast partial scalarization. FIG. 6C illustrates an example relationship table 601-b, encoding information 602-b, and split information 603-b generated by the device 105 based on a first iteration of merging and updating split information and the relationship table (e.g., a first iteration of 310 described with respect to FIG. 3). In FIG. 6C, updated encoding information and split information compared to FIG. 6B are indicated in bold.

FIG. 6D illustrates an example relationship table 601-c, encoding information 602-c, and split information 603-c generated by the device 105 based on a second iteration of merging and updating split information and the relationship table (e.g., a second iteration of 310 described with respect to FIG. 3). In FIG. 6D, updated encoding information and split information compared to FIG. 6C are indicated in bold. FIG. 6D also represents the third and final iteration as there would be no changes in the third iteration in this example (e.g., the split information will not change). FIG. 6E illustrates an example of split information 603-d generated by the device 105 by splitting the vector instructions based on the updated split information (e.g., at 320 described with respect to FIG. 3, for example, following an iteration of 310 and 315 in which the split information has not changed). FIG. 6F illustrates an example of a partially scalarized intermediate representation 604 generated by the device 105 (e.g., at 320 described with respect to FIG. 3) according to examples of aspects described herein.

Figure 7:
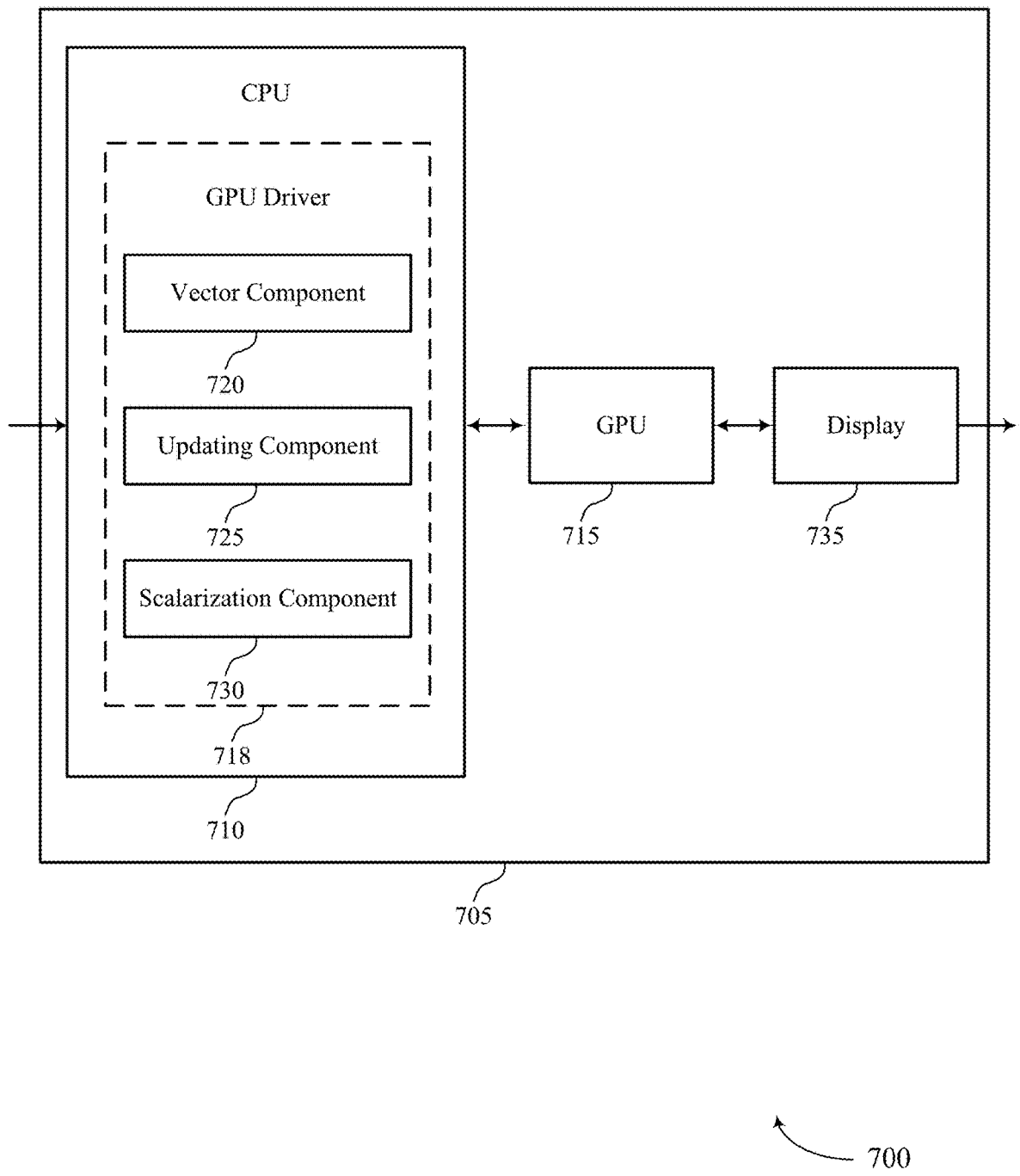
FIG. 7 shows a block diagram of a device that supports fast partial scalarization in accordance with aspects of the present disclosure.

FIG. 7 shows a block diagram 700 of a device 705 that supports fast partial scalarization in accordance with aspects of the present disclosure. The device 705 may be an example of aspects a device 105 or a device 200 as described herein. The device 705 may include a CPU 710, a GPU 715, and a display 735. The device 705 may also include a general processor. Each of these components may be in communication with one another (e.g., via one or more buses). One or more of these components may be means for supporting fast partial scalarization.

CPU 710 may be an example of CPU 210 described with reference to FIG. 2. CPU 710 may execute one or more software applications, such as web browsers, graphical user interfaces, video games, or other applications involving graphics rendering for image depiction (e.g., via display 735). As described herein, CPU 710 may encounter a GPU program (e.g., a program suited for handling by GPU 715) when executing the one or more software applications. Accordingly, CPU 710 may submit rendering commands to GPU 715 (e.g., via a GPU driver 718 containing a compiler for parsing API-based commands).

CPU 710 may include the GPU driver 718. The GPU driver 718 may include a vector component 720, an updating component 725, and a scalarization component 730. The GPU driver 718 may be an example of aspects of the GPU driver 945 described herein. The vector component 720 may generate a representation of a set of vectors and a set of vector instructions associated with the set of vectors, determine information associated with a vector in the set of vectors based on the representation, the information including an indication of splitting the vector and splitting one or more vector instructions associated with the vector, and associate the vector to one or more other vectors in the set of vectors based on one or more vector instructions related to the set of vectors. The updating component 725 may update the information based on the associating. The scalarization component 730 may generate partially scalarized instructions based on the updating.

The GPU driver 718 may generate a representation of a set of vectors and a set of vector instructions associated with the set of vectors, determine information associated with a vector in the set of vectors based on the representation, the information including an indication of splitting the vector and splitting one or more vector instructions associated with the vector, associate the vector to one or more other vectors in the set of vectors based on one or more vector instructions related to the set of vectors, update the information based on the associating, and generate partially scalarized instructions based on the updating. The GPU driver 718 may be an example of aspects of the GPU driver 945 described herein.

The GPU driver 718, or its sub-components, may be implemented in hardware, code (e.g., software or firmware) executed by a processor, or any combination thereof. If implemented in code executed by a processor, the functions of the GPU driver 718, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The GPU driver 718, or its sub-components, may be physically located at various positions, including being distributed such that portions of functions are implemented at different physical locations by one or more physical components. In some examples, the GPU driver 718, or its sub-components, may be a separate and distinct component in accordance with various aspects of the present disclosure. In some examples, the GPU driver 718, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The GPU 715, or its sub-components, may be implemented in hardware, code (e.g., software or firmware) executed by a processor, or any combination thereof. If implemented in code executed by a processor, the functions of the GPU 715, or its sub-components may be executed by a general-purpose processor, a DSP, an ASIC, an FPGA, an SOC, or other programmable logic device, discrete gate or transistor logic, discrete hardware components, or any combination thereof designed to perform the functions described in the present disclosure.

The GPU 715, or its sub-components, may be physically located at various positions, including being distributed such that portions of functions are implemented at different physical locations by one or more physical components. In some examples, the GPU 715, or its sub-components, may be a separate and distinct component in accordance with various aspects of the present disclosure. In some examples, the GPU 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Display 735 may display content generated by other components of the device. Display 735 may be an example of display 245 as described with reference to FIG. 2. In some examples, display 735 may be connected with a display buffer which stores rendered data until an image is ready to be displayed (e.g., as described with reference to FIG. 2). The display 735 may illuminate according to signals or information generated by other components of the device 705. For example, the display 735 may receive display information (e.g., pixel mappings, display adjustments) from GPU 715, and may illuminate accordingly. The display 735 may represent a unit capable of displaying video, images, text or any other type of data for consumption by a viewer. Display 735 may include a liquid-crystal display (LCD), a light emitting diode (LED) display, an organic LED (OLED), an active-matrix OLED (AMOLED), or the like. In some cases, display 735 and an I/O controller (e.g., I/O controller 915) may be or represent aspects of a same component (e.g., a touchscreen) of device 705.

Figure 8:
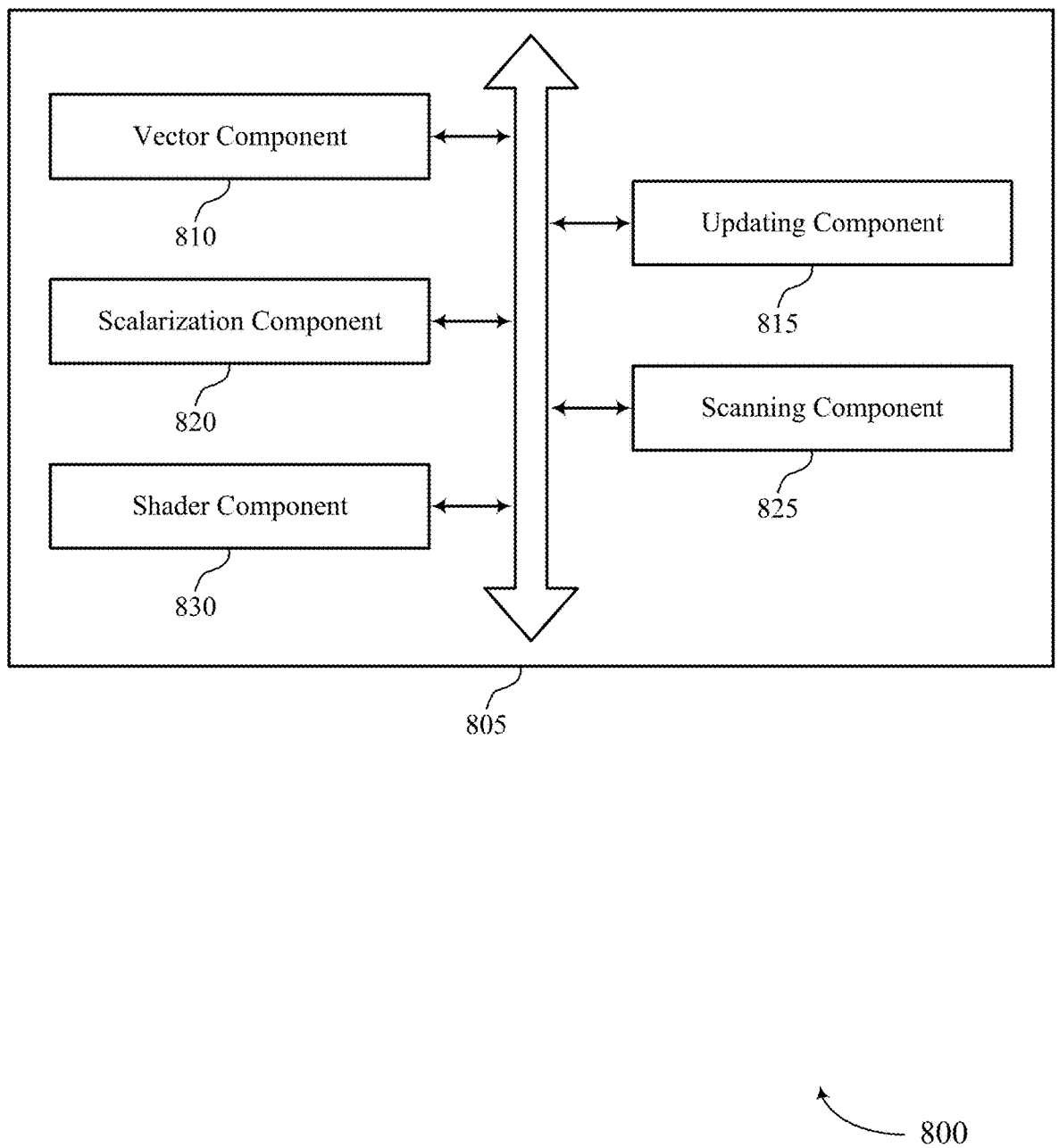
FIG. 8 shows a block diagram of a graphics processing unit (GPU) driver on a device that supports fast partial scalarization in accordance with aspects of the present disclosure.

FIG. 8 shows a block diagram 800 of a GPU driver 805 on the device 705 that supports fast partial scalarization in accordance with aspects of the present disclosure. The GPU driver 805 may be an example of aspects of a GPU driver 718, or a GPU driver 945 described herein. The GPU driver 805 may include a vector component 810, an updating component 815, a scalarization component 820, a scanning component 825, and a shader component 830. Each of these components may communicate, directly or indirectly, with one another (e.g., via one or more buses). One or more of these components may be means for supporting fast partial scalarization.

The vector component 810 may generate a representation of a set of vectors and a set of vector instructions associated with the set of vectors. In some examples, the vector component 810 may determine information associated with a vector in the set of vectors based on the representation, the information including an indication of splitting the vector and splitting one or more vector instructions associated with the vector. In some examples, the vector component 810 may associate the vector to one or more other vectors in the set of vectors based on one or more vector instructions related to the set of vectors. In some examples, the vector component 810 may aggregate information of the vector and information of the one or more other vectors. In some aspects, the information of the vector may be associated with a first vector instruction of the one or more vector instructions, and the information of the one or more other vectors may be associated with the first vector instruction or a second vector instruction of the one or more vector instructions.

In some examples, the vector component 810 may aggregate the information of the vector and the information of the one or more other vectors based on a bitwise operation. In some examples, the vector component 810 may determine a set of vector operations associated with the set of vectors, the set of vector instructions associated with the set of vectors, the one or more other vectors in the set of vectors, or one or more other vector instructions associated with the one or more other vectors based on the scanning.

In some examples, the vector component 810 may associate the vector to one or more other vectors in the set of vectors based on the set of vector operations. In some examples, the vector component 810 may determine a common vector operation between the set of vector operations. In some examples, the vector component 810 may associate the vector to one or more other vectors in the set of vectors based on the common vector operation. In some examples, the vector component 810 may aggregate information of the vector and information of an other vector of the one or more other vectors based on the associating. In some aspects, the information of the vector may be associated with a first vector instruction of the one or more vector instructions, and the information of the other vector of the one or more other vectors may be associated with the first vector instruction or a second vector instruction of the one or more vector instructions.

In some examples, the vector component 810 may determine a first set of channels associated with the set of vectors or the set of vector instructions associated with the set of vectors, or both, based on the scanning. In some examples, the vector component 810 may determine a second set of channels associated with the set of vectors, the set of vector instructions associated with the set of vectors, the one or more other vectors in the set of vectors, or one or more other vector instructions associated with the one or more other vectors based on the scanning. In some examples, the vector component 810 may associate the vector to one or more other vectors in the set of vectors based on the first set of channels or the second set of channels, or both. In some examples, the vector component 810 may determine a common vector operation between the first set of channels or the second set of channels, or both.

In some examples, the vector component 810 may determine information associated with an other vector of the one or more other vectors in the set of vectors based on the representation, the information including an indication of splitting the other vector and splitting one or more other vector instructions associated with the other vector. In some examples, the vector component 810 may associate the vector to one or more other vectors in the set of vectors based on one or more vector instructions related to the set of vectors or the one or more other vector instructions associated with the other vector, or both. In some examples, the vector component 810 may generate the representation of the set of vectors and the set of vector instructions based on the identifying.

The updating component 815 may update the information based on the associating. In some examples, the updating component 815 may update the information based on the aggregating. The scalarization component 820 may generate partially scalarized instructions based on the updating. In some examples, the scalarization component 820 may exclude a subset of vector instructions from the set of vector instructions. In some examples, the scalarization component 820 may generate one or more additional subsets of vector instructions. In some examples, the one or more additional subsets of vector instructions may have a lower dimensionality compared to a set of vector instructions subject to a split (e.g., the set of vector instructions from which the one or more additional subsets of vector instructions are generated). In some example aspects, scalarization component 820 may generate one or more additional subsets of scalar instructions. In some examples, the scalarization component 820 may output the updated information including the partially scalarized instructions. The GPU driver 805 may render graphics information using one or more shader programs running on the device 705 based on the updated information including the partially scalarized instructions and outputting the rendered graphics information.

The scanning component 825 may scan the set of vectors or the set of vector instructions associated with the set of vectors, or both. The shader component 830 may identify one or more shader programs running on the device 705. In some examples, the shader component 830 may convert, using a graphics compiler associated with the device 705, one or more shader programs into the representation of the set of vectors and the set of vector instructions associated with the set of vectors. In some aspects, the representation includes an intermediate representation. In some cases, the one or more shader programs includes the set of vectors and the set of vector instructions. In some cases, the intermediate representation includes a data structure or a code representing a source code for a graphics application running on the device 705.

Figure 9:
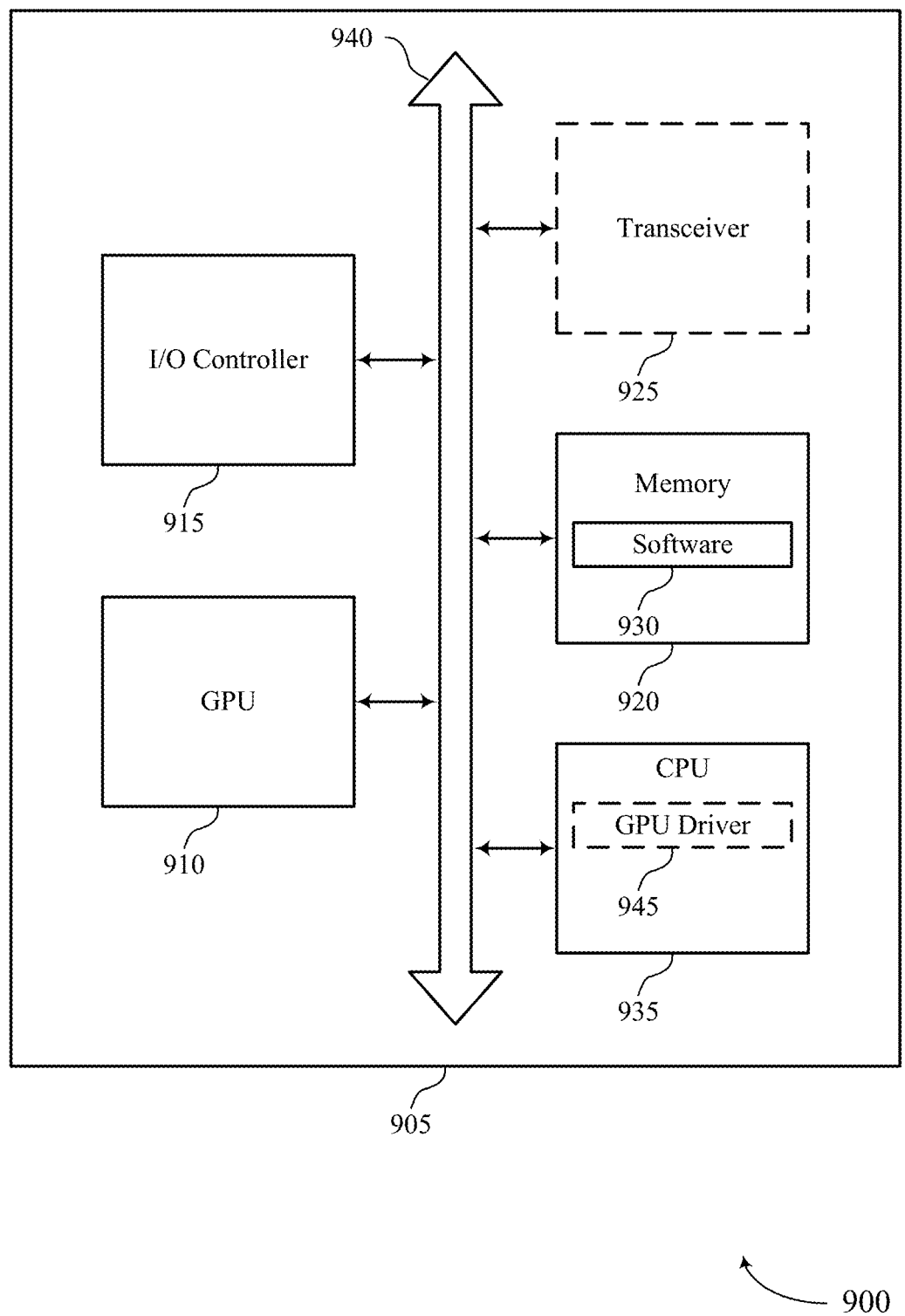
FIG. 9 shows a diagram of a system including a device that supports fast partial scalarization in accordance with aspects of the present disclosure.

FIG. 9 shows a diagram of a system 900 including a device 905 that supports fast partial scalarization in accordance with aspects of the present disclosure. The device 905 may be an example of or include the components of device 705, or a GPU driver 718 on the device 705 as described herein. The device 905 may include components for bi-directional voice and data communications including components for transmitting and receiving communications, including a GPU 910, an I/O controller 915, memory 920, a transceiver 925, and a CPU 935. These components may be in electronic communication via one or more buses (e.g., bus).

The GPU driver 945 may generate a representation of a set of vectors and a set of vector instructions associated with the set of vectors, determine information associated with a vector in the set of vectors based on the representation, the information including an indication of splitting the vector and splitting one or more vector instructions associated with the vector, associate the vector to one or more other vectors in the set of vectors based on one or more vector instructions related to the set of vectors, update the information based on the associating, and generate partially scalarized instructions based on the updating.

I/O controller 915 may manage input and output signals for device 905. I/O controller 915 may also manage peripherals not integrated into device 905. In some cases, I/O controller 915 may represent a physical connection or port to an external peripheral. In some cases, I/O controller 915 may utilize an operating system such as iOS®, ANDROID®, MS-DOS®, MS-WINDOWS®, OS/2®, UNIX®, LINUX®, or another known operating system. In other cases, I/O controller 915 may represent or interact with a modem, a keyboard, a mouse, a touchscreen, or a similar device. In some cases, I/O controller 915 may be implemented as part of a processor. In some cases, a user may interact with device 905 via I/O controller 915 or via hardware components controlled by I/O controller 915.

The memory 920 may include RAM and ROM. The memory 920 may store computer-readable, computer-executable code or software 930 including instructions that, when executed, cause the processor to perform various functions described herein. In some cases, the memory 920 may contain, among other things, a BIOS which may control basic hardware or software operation such as the interaction with peripheral components or devices.

The transceiver 925 may communicate bi-directionally, via one or more antennas, wired, or wireless links as described above. For example, the transceiver 925 may represent a wireless transceiver and may communicate bi-directionally with another wireless transceiver. The transceiver 925 may also include a modem to modulate the packets and provide the modulated packets to the antennas for transmission, and to demodulate packets received from the antennas.

The software 930 may include instructions to implement aspects of the present disclosure, including instructions to support graphics processing. The software 930 may be stored in a non-transitory computer-readable medium such as system memory or other type of memory. In some cases, the software 930 may not be directly executable by the CPU 935 but may cause a computer (e.g., when compiled and executed) to perform functions described herein.

The CPU 935 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, a GPU driver 945 may be integrated into the CPU 935. The GPU driver 945 may be an example of the GPU driver 718 or the GPU driver 805 described herein. In some cases, the CPU 935 may be configured to operate a memory array using a memory controller. In other cases, a memory controller may be integrated into the CPU 935. The CPU 935 may be configured to execute computer-readable instructions stored in a memory (e.g., the memory 920) to cause the device 905 to perform various functions (e.g., functions or tasks supporting fast partial scalarization).

In some cases, the GPU 910 and/or the CPU 935 may include an intelligent hardware device, (e.g., a general-purpose processor, a DSP, a microcontroller, an ASIC, an FPGA, an SOC, a programmable logic device, a discrete gate or transistor logic component, a discrete hardware component, or any combination thereof). In some cases, the GPU 910 and/or the CPU 935 may be configured to operate a memory array using a memory controller. In other cases, a memory controller may be integrated into the GPU 910 and/or the CPU 935. The GPU 910 and/or the CPU 935 may be configured to execute computer-readable instructions stored in a memory (e.g., the memory 920) to cause the device 905 to perform various functions (e.g., functions or tasks supporting fast partial scalarization).

Figure 10:
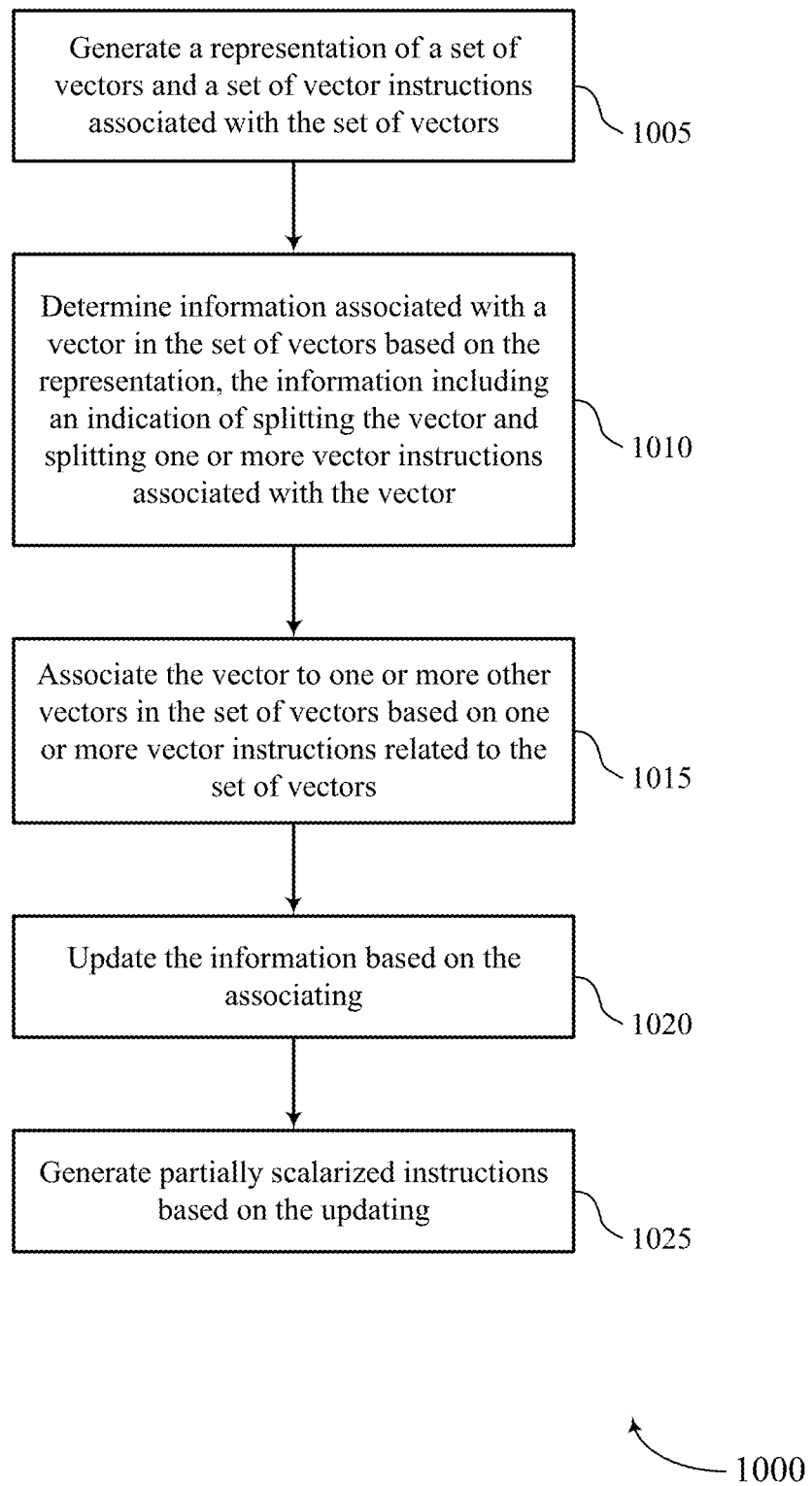
FIGS. 10 through 12 show flowcharts illustrating methods that support fast partial scalarization in accordance with aspects of the present disclosure

FIG. 10 shows a flowchart illustrating a method 1000 that supports fast partial scalarization in accordance with aspects of the present disclosure. The operations of method 1000 may be implemented by a GPU driver on a device or its components as described herein. For example, the operations of method 1000 may be performed by a GPU driver as described with reference to FIGS. 7 through 9. In some examples, a GPU driver may execute a set of instructions to control the functional elements of the GPU driver to perform the functions described below. Additionally or alternatively, a GPU driver may perform aspects of the functions described below using special-purpose hardware.

At 1005, the GPU driver may generate a representation of a set of vectors and a set of vector instructions associated with the set of vectors. The operations of 1005 may be performed according to the methods described herein. In some examples, aspects of the operations of 1005 may be performed by a vector component as described with reference to FIGS. 7 through 9.

At 1010, the GPU driver may determine information associated with a vector in the set of vectors based on the representation, the information including an indication of splitting the vector and splitting one or more vector instructions associated with the vector. The operations of 1010 may be performed according to the methods described herein. In some examples, aspects of the operations of 1010 may be performed by a vector component as described with reference to FIGS. 7 through 9.

At 1015, the GPU driver may associate the vector to one or more other vectors in the set of vectors based on one or more vector instructions related to the set of vectors. The operations of 1015 may be performed according to the methods described herein. In some examples, aspects of the operations of 1015 may be performed by a vector component as described with reference to FIGS. 7 through 9.

At 1020, the GPU driver may update the information based on the associating. The operations of 1020 may be performed according to the methods described herein. In some examples, aspects of the operations of 1020 may be performed by an updating component as described with reference to FIGS. 7 through 9.

At 1025, the GPU driver may generate partially scalarized instructions based on the updating. The operations of 1025 may be performed according to the methods described herein. In some examples, aspects of the operations of 1025 may be performed by a scalarization component as described with reference to FIGS. 7 through 9.

Figure 11:
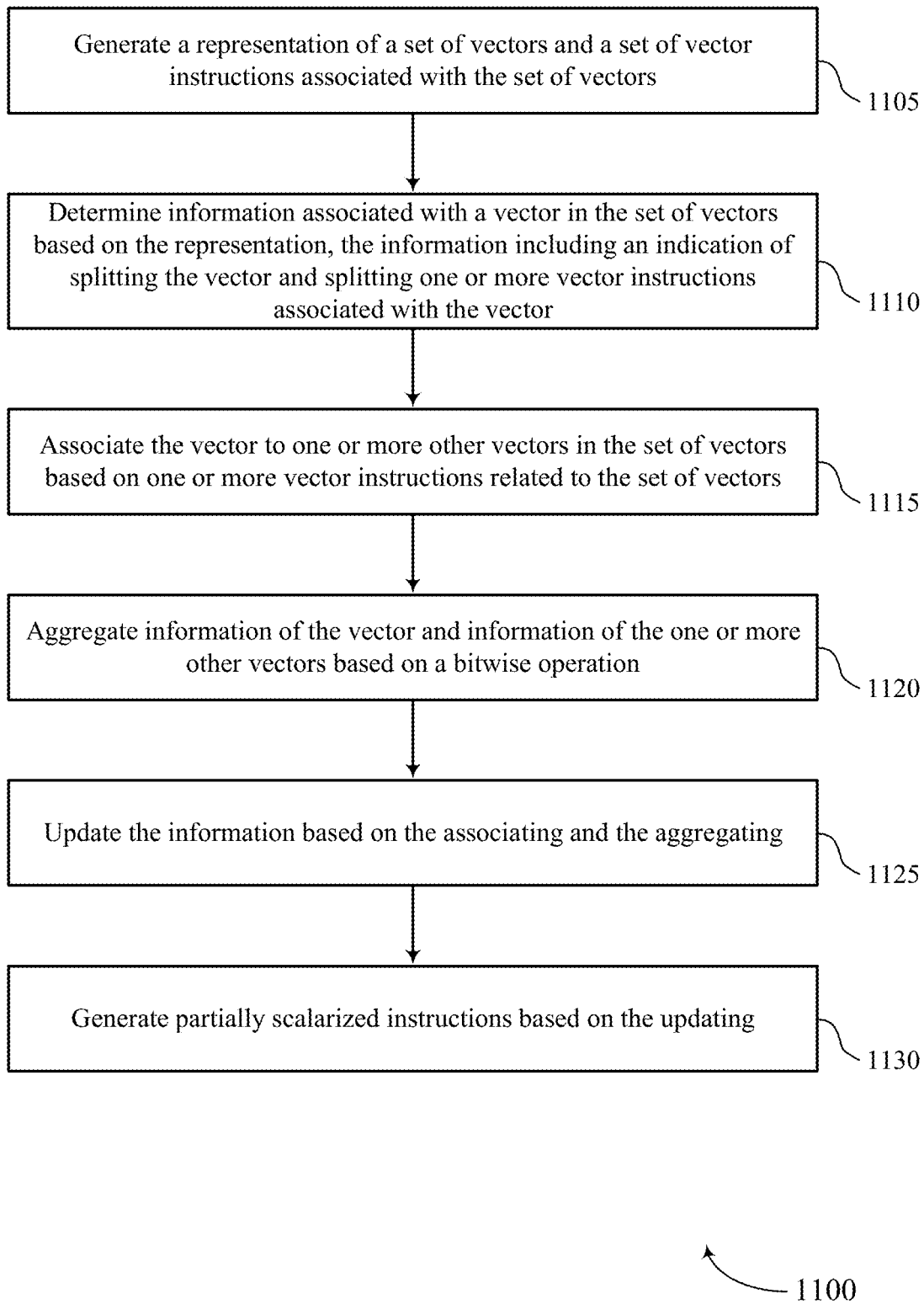

FIG. 11 shows a flowchart illustrating a method 1100 that supports fast partial scalarization in accordance with aspects of the present disclosure. The operations of method 1100 may be implemented by a GPU driver on a device or its components as described herein. For example, the operations of method 1100 may be performed by a GPU driver as described with reference to FIGS. 7 through 9. In some examples, a GPU driver may execute a set of instructions to control the functional elements of the GPU driver to perform the functions described below. Additionally or alternatively, a GPU driver may perform aspects of the functions described below using special-purpose hardware.

At 1105, the GPU driver may generate a representation of a set of vectors and a set of vector instructions associated with the set of vectors. The operations of 1105 may be performed according to the methods described herein. In some examples, aspects of the operations of 1105 may be performed by a vector component as described with reference to FIGS. 7 through 9.

At 1110, the GPU driver may determine information associated with a vector in the set of vectors based on the representation, the information including an indication of splitting the vector and splitting one or more vector instructions associated with the vector. The operations of 1110 may be performed according to the methods described herein. In some examples, aspects of the operations of 1110 may be performed by a vector component as described with reference to FIGS. 7 through 9.

At 1115, the GPU driver may associate the vector to one or more other vectors in the set of vectors based on one or more vector instructions related to the set of vectors. The operations of 1115 may be performed according to the methods described herein. In some examples, aspects of the operations of 1115 may be performed by a vector component as described with reference to FIGS. 7 through 9.

At 1120, the GPU driver may aggregate information of the vector and information of the one or more other vectors. The GPU driver may aggregate the information of the vector and information of the one or more other vectors based on a bitwise operation. The operations of 1120 may be performed according to the methods described herein. In some examples, aspects of the operations of 1120 may be performed by a vector component as described with reference to FIGS. 7 through 9.

At 1125, the GPU driver may update the information based on the associating and the aggregating. The operations of 1125 may be performed according to the methods described herein. In some examples, aspects of the operations of 1125 may be performed by an updating component as described with reference to FIGS. 7 through 9.

At 1130, the GPU driver may generate partially scalarized instructions based on the updating. The operations of 1130 may be performed according to the methods described herein. In some examples, aspects of the operations of 1130 may be performed by a scalarization component as described with reference to FIGS. 7 through 9.

Figure 12:
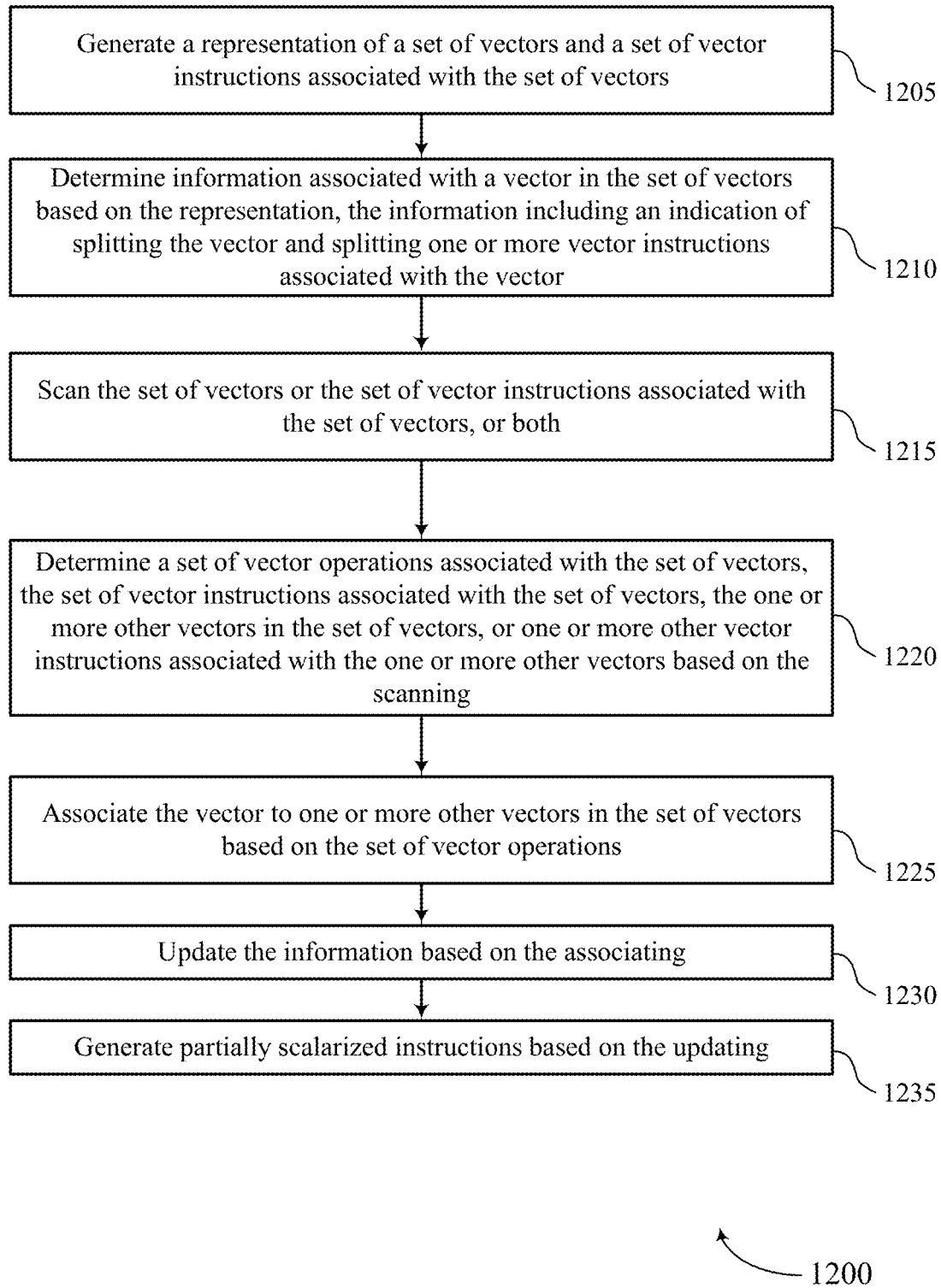

FIG. 12 shows a flowchart illustrating a method 1200 that supports fast partial scalarization in accordance with aspects of the present disclosure. The operations of method 1200 may be implemented by a GPU driver on a device or its components as described herein. For example, the operations of method 1200 may be performed by a GPU driver as described with reference to FIGS. 7 through 9. In some examples, a GPU driver may execute a set of instructions to control the functional elements of the GPU driver to perform the functions described below. Additionally or alternatively, a GPU driver may perform aspects of the functions described below using special-purpose hardware.

At 1205, the GPU driver may generate a representation of a set of vectors and a set of vector instructions associated with the set of vectors. The operations of 1205 may be performed according to the methods described herein. In some examples, aspects of the operations of 1205 may be performed by a vector component as described with reference to FIGS. 7 through 9.

At 1210, the GPU driver may determine information associated with a vector in the set of vectors based on the representation, the information including an indication of splitting the vector and splitting one or more vector instructions associated with the vector. The operations of 1210 may be performed according to the methods described herein. In some examples, aspects of the operations of 1210 may be performed by a vector component as described with reference to FIGS. 7 through 9.

At 1215, the GPU driver may scan the set of vectors or the set of vector instructions associated with the set of vectors, or both. The operations of 1215 may be performed according to the methods described herein. In some examples, aspects of the operations of 1230 may be performed by a scanning component as described with reference to FIGS. 7 through 9.

At 1220, the GPU driver may determine a set of vector operations associated with the set of vectors, the set of vector instructions associated with the set of vectors, the one or more other vectors in the set of vectors, or one or more other vector instructions associated with the one or more other vectors based on the scanning. The operations of 1220 may be performed according to the methods described herein. In some examples, aspects of the operations of 1220 may be performed by a vector component as described with reference to FIGS. 7 through 9.

At 1225, the GPU driver may associate the vector to one or more other vectors in the set of vectors based on the set of vector operations. The operations of 1225 may be performed according to the methods described herein. In some examples, aspects of the operations of 1225 may be performed by a vector component as described with reference to FIGS. 7 through 9.

At 1230, the GPU driver may update the information based on the associating. The operations of 1230 may be performed according to the methods described herein. In some examples, aspects of the operations of 1230 may be performed by an updating component as described with reference to FIGS. 7 through 9.

At 1235, the GPU driver may generate partially scalarized instructions based on the updating. The operations of 1235 may be performed according to the methods described herein. In some examples, aspects of the operations of 1235 may be performed by a scalarization component as described with reference to FIGS. 7 through 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for graphics processing at a device, comprising:
   generating a representation of a set of vectors and a set of vector instructions associated with the set of vectors;
   determining information associated with a vector in the set of vectors based at least in part on the representation, the information comprising an indication of splitting the vector and splitting one or more vector instructions associated with the vector;

encoding the information of splitting the vector and splitting the one or more vector instructions associated with the vector using a swizzle pal information encoding scheme for each channel of the vector, wherein the encoding indicates a relationship between each channel of the vector and a joint access to each channel of the vector or a separate access to each channel of the vector;

associating the vector to one or more other vectors in the set of vectors based at least in part on one or more vector instructions related to the set of vectors;

updating, in a relationship table of the device by mapping the vector to the one or more other vectors using a bitwise AND operation, the information comprising the indication of splitting the vector and splitting the one or more vector instructions associated with the vector based at least in part on the associating; and generating partially scalarized instructions based at least in part on the updating.

2. The method of claim 1, wherein generating the partially scalarized instructions comprises:

excluding a subset of vector instructions from the set of vector instructions; and generating one or more additional subsets of vector instructions and scalar instructions.

3. The method of claim 1, further comprising:

aggregating information of the vector and information of the one or more other vectors, wherein:
the information of the vector is associated with a first vector instruction of the one or more vector instructions,
the information of the one or more other vectors is associated with the first vector instruction or a second vector instruction of the one or more vector instructions, and
updating the information is based at least in part on the aggregating.

4. The method of claim 3, wherein aggregating the information of the vector and the information of the one or more other vectors comprises:

aggregating the information of the vector and the information of the one or more other vectors based at least in part on the bitwise operation.

5. The method of claim 1, further comprising:

outputting the updated information including the partially scalarized instructions, wherein outputting the updated information including the partially scalarized instructions comprises:
rendering graphics information using one or more shader programs running on the device based at least in part on the updated information including the partially scalarized instructions; and
outputting the rendered graphics information.

6. The method of claim 1, further comprising:

scanning the set of vectors or the set of vector instructions associated with the set of vectors, or both; and determining a set of vector operations associated with the set of vectors, the set of vector instructions associated with the set of vectors, the one or more other vectors in the set of vectors, or one or more other vector instructions associated with the one or more other vectors based at least in part on the scanning, wherein associating the vector to the one or more other vectors in the set of vectors is based at least in part on the set of vector operations.

7. The method of claim 6, further comprising:

determining a common vector operation between the set of vector operations, wherein associating the vector to the one or more other vectors in the set of vectors is based at least in part on the common vector operation.

8. The method of claim 6, further comprising:

aggregating information of the vector and information of an other vector of the one or more other vectors based at least in part on the associating, wherein:
the information of the vector is associated with a first vector instruction of the one or more vector instructions,
the information of the other vector of the one or more other vectors is associated with the first vector instruction or a second vector instruction of the one or more vector instructions, and
updating the information is based at least in part on the aggregating.

9. The method of claim 1, further comprising:

scanning the set of vectors or the set of vector instructions associated with the set of vectors, or both;

determining a first set of channels associated with the set of vectors or the set of vector instructions associated with the set of vectors, or both, based at least in part on the scanning; and determining a second set of channels associated with the set of vectors, the set of vector instructions associated with the set of vectors, the one or more other vectors in the set of vectors, or one or more other vector instructions associated with the one or more other vectors based at least in part on the scanning, wherein associating the vector to the one or more other vectors in the set of vectors is based at least in part on the first set of channels or the second set of channels, or both.

10. The method of claim 9, further comprising:

determining a common vector operation between the first set of channels or the second set of channels, or both, wherein associating the vector to the one or more other vectors in the set of vectors is based at least in part on the common vector operation.

11. The method of claim 9, further comprising:

aggregating information of the vector and information of an other vector of the one or more other vectors based at least in part on the associating, wherein:
the information of the vector is associated with a first vector instruction of the one or more vector instructions,
the information of the other vector of the one or more other vectors is associated with the first vector instruction or a second vector instruction of the one or more vector instructions, and
updating the information is based at least in part on the aggregating.

12. The method of claim 1, further comprising:

determining information associated with an other vector of the one or more other vectors in the set of vectors based at least in part on the representation, the information comprising an indication of splitting the other vector and splitting one or more other vector instructions associated with the other vector, wherein associating the vector to the one or more other vectors in the set of vectors is based at least in part on one or more vector instructions related to the set of vectors or the one or more other vector instructions associated with the other vector, or both.

13. The method of claim 1, further comprising:
identifying one or more shader programs running on the device, the one or more shader programs comprises the set of vectors and the set of vector instructions,
wherein generating the representation of the set of vectors and the set of vector instructions is based at least in part on the identifying.

14. The method of claim 1, further comprising:
traversing the relationship table a number of times based at least in part on a change in the information during each traverse of the relationship table.

15. The method of claim 1, further comprising:
converting, using a graphics compiler associated with the device, one or more shader programs into the representation of the set of vectors and the set of vector instructions associated with the set of vectors, wherein the representation comprises an intermediate representation.

16. The method of claim 15, wherein the intermediate representation comprises a data structure for a graphics application running on the device.

17. An apparatus for graphics processing, comprising:
a processor, memory coupled with the processor; and
instructions stored in the memory and executable by the processor to:
generate a representation of a set of vectors and a set of vector instructions associated with the set of vectors;
determine information associated with a vector in the set of vectors based at least in part on the representation, the information comprising an indication of splitting the vector and splitting one or more vector instructions associated with the vector;
encode the information of splitting the vector and splitting the one or more vector instructions associated with the vector using a swizzle pal information encoding scheme for each channel of the vector, wherein the encoding indicates a relationship between each channel of the vector and a joint access to each channel of the vector or a separate access to each channel of the vector;
associate the vector to one or more other vectors in the set of vectors based at least in part on one or more vector instructions related to the set of vectors;
update, in a relationship table of the apparatus by mapping the vector to the one or more other vectors using a bitwise AND operation, the information comprising the indication of splitting the vector and splitting the one or more vector instructions associated with the vector based at least in part on the associating; and
generate partially scalarized instructions based at least in part on the updating.

18. The apparatus of claim 17, wherein the instructions to generate the partially scalarized instructions are further executable by the processor to:
exclude a subset of vector instructions from the set of vector instructions; and
generate one or more additional subsets of vector instructions and scalar instructions.

19. The apparatus of claim 17, wherein the instructions are further executable by the processor to:
aggregate information of the vector and information of the one or more other vectors,
wherein:
the information of the vector is associated with a first vector instruction of the one or more vector instructions,
the information of the one or more other vectors is associated with the first vector instruction or a second vector instruction of the one or more vector instructions, and
the instructions to update the information are further executable by the processor based at least in part on the aggregating.

20. An apparatus for graphics processing, comprising:
means for generating a representation of a set of vectors and a set of vector instructions associated with the set of vectors;
means for determining information associated with a vector in the set of vectors based at least in part on the representation, the information comprising an indication of splitting the vector and splitting one or more vector instructions associated with the vector;
means for encoding the information of splitting the vector and splitting the one or more vector instructions associated with the vector using a swizzle pal information encoding scheme for each channel of the vector, wherein the encoding indicates a relationship between each channel of the vector and a joint access to each channel of the vector or a separate access to each channel of the vector;
means for associating the vector to one or more other vectors in the set of vectors based at least in part on one or more vector instructions related to the set of vectors;
means for updating, in a relationship table of the apparatus by mapping the vector to the one or more other vectors using a bitwise AND operation, the information comprising the indication of splitting the vector and splitting the one or more vector instructions associated with the vector based at least in part on the associating; and
means for generating partially scalarized instructions based at least in part on the updating.

* * * * *